(12) United States Patent
Kuhns et al.

(10) Patent No.: US 11,998,984 B2
(45) Date of Patent: Jun. 4, 2024

(54) ADDITIVELY MANUFACTURED NON-UNIFORM POROUS MATERIALS AND COMPONENTS IN-SITU WITH FULLY MATERIAL, AND RELATED METHODS, SYSTEMS AND COMPUTER PROGRAM PRODUCT

(71) Applicant: Masten Space Systems, Inc., Mojave, CA (US)

(72) Inventors: Matthew Kuhns, Mojave, CA (US); Jacob S. Nuechterlein, Erie, CO (US); Jeremy Joseph Iten, Erie, CO (US); Adam Polizzi, Erie, CO (US)

(73) Assignee: ASTROBOTIC TECHNOLOGY, INC., Pittsburgh, PA (US)

( * ) Notice: Subject to any disclaimer, the term of this patent is extended or adjusted under 35 U.S.C. 154(b) by 406 days.

(21) Appl. No.: 16/372,401

(22) Filed: Apr. 1, 2019

(65) Prior Publication Data
US 2019/0299290 A1   Oct. 3, 2019

Related U.S. Application Data

(60) Provisional application No. 62/651,196, filed on Apr. 1, 2018.

(51) Int. Cl.
*B22F 3/11* (2006.01)
*B22F 7/00* (2006.01)
(Continued)

(52) U.S. Cl.
CPC ............... *B22F 3/11* (2013.01); *B22F 7/002* (2013.01); *B22F 10/28* (2021.01); *B22F 10/34* (2021.01);
(Continued)

(58) Field of Classification Search
CPC ......... B22F 3/11; B22F 3/1103; B22F 3/1109; B22F 3/1112; B22F 3/1115; B22F 3/1118;
(Continued)

(56) References Cited

U.S. PATENT DOCUMENTS 10,016,811 B2   7/2018   Neal
10,234,848 B2   3/2019   Mehr et al.
(Continued)

FOREIGN PATENT DOCUMENTS

JP   2018076813 A   *   5/2018
WO   2017117527         7/2017

OTHER PUBLICATIONS

Hutchinson, Lee, "NASA test-fires 3D printed rocket parts: low cost, high power innovation," Ars Technica, <https://arstechnica.com/science/2013/08/nasa-test-fires-3d-printed-rocket-parts-low-cost-high-power-innovation/>, published Aug. 28, 2013, 9 pages (printout). (Year: 2013).*

(Continued)

*Primary Examiner* — Vanessa T. Luk
(74) *Attorney, Agent, or Firm* — Silver Legal LLC; Jarrett L. Silver

(57) ABSTRACT

An additively manufactured non-uniform porous material in-situ with dense material for the in situ additive manufacturing of both porous and dense material in the same part so that no secondary process is required. The additively manufactured non-uniform porous material in-situ with dense material generally includes additively manufactured porous material which can be tuned for porosity and density, has the ability to be built in situ with dense material, and can also be tuned for response to pressure waves. Also included are computer program products, methods and components and systems manufactured using the methods.

29 Claims, 24 Drawing Sheets

(51) Int. Cl.
*B22F 10/28* (2021.01)
*B22F 10/34* (2021.01)
*B22F 10/38* (2021.01)
*B22F 10/80* (2021.01)
*B23K 26/082* (2014.01)
*B33Y 10/00* (2015.01)
*B33Y 70/00* (2020.01)
*B22F 10/32* (2021.01)
*B22F 10/366* (2021.01)
*B33Y 30/00* (2015.01)
*B33Y 50/02* (2015.01)
*B33Y 80/00* (2015.01)

(52) U.S. Cl.
CPC .............. *B22F 10/38* (2021.01); *B22F 10/80* (2021.01); *B23K 26/082* (2015.10); *B33Y 70/00* (2014.12); *B22F 10/32* (2021.01); *B22F 10/366* (2021.01); *B22F 2998/10* (2013.01); *B33Y 10/00* (2014.12); *B33Y 30/00* (2014.12); *B33Y 50/02* (2014.12); *B33Y 80/00* (2014.12)

(58) Field of Classification Search
CPC ..... B22F 3/1121; B22F 3/1125; B22F 3/1134; B22F 3/1137; B22F 3/114; B22F 3/1143; B22F 3/1146; B22F 2003/1106; B22F 2003/1128; B22F 2003/1131; B22F 7/00; B22F 7/002; B22F 7/004; B22F 2207/17; B23K 5/18; B23K 9/04; B23K 9/042; B23K 9/044; B23K 10/027; B23K 11/0013; B23K 15/0086; B23K 25/005; B23K 26/34; B23K 26/342; B23K 26/354; B28B 1/001; B33Y 10/00; B33Y 30/00; B33Y 50/00; B33Y 50/02; B33Y 80/00; F28D 15/00; F28D 15/02; F28D 15/0208; F28D 15/0233; F28D 15/0241; F28D 15/025; F28D 15/0258; F28D 15/0266; F28D 15/0275; F28D 15/0283; F28D 15/04; F28D 15/043; F28D 15/046; F28D 15/06; F28D 2015/0216; F28D 2015/0225; F28D 2015/0291
See application file for complete search history.

(56) References Cited

U.S. PATENT DOCUMENTS

| | | | | |
|---|---|---|---|---|
| 2006/0245987 A1* | 11/2006 | Schmidt | ................ | F28F 13/003 422/198 |
| 2013/0056912 A1* | 3/2013 | O'Neill | ............... | A61F 2/30771 264/497 |
| 2014/0140882 A1* | 5/2014 | Syassen | ................ | B33Y 30/00 419/53 |
| 2015/0137412 A1* | 5/2015 | Schalansky | ............. | B22F 10/20 264/129 |
| 2016/0271878 A1 | 9/2016 | Nuechterlein et al. | | |
| 2017/0239726 A1 | 8/2017 | Palumbo et al. | | |
| 2017/0274456 A1 | 9/2017 | Walker et al. | | |
| 2017/0284206 A1* | 10/2017 | Roberts | ................... | B22F 10/20 |
| 2018/0272323 A1* | 9/2018 | Mullens | ................ | B01J 29/084 |
| 2019/0054534 A1 | 2/2019 | Norton et al. | | |
| 2019/0054535 A1 | 2/2019 | Norton et al. | | |
| 2019/0054567 A1 | 2/2019 | Roerig et al. | | |
| 2020/0200487 A1* | 6/2020 | Karesh | .................. | B33Y 80/00 |

OTHER PUBLICATIONS

How can you pre-heat a weld using only laser beam?, https://www.researchgate.net/post/How_can_you_pre-heat_a_weld_using_only_laser_beam, pp. 1-6, ResearchGate 2019.

DMG MORI, New method of manufacturing using powder bed: Additive Manufacturing with Selective Laser Melting; Youtube Video (Screenshot attached—Nothing relevant outside of screenshot). (publication date not provided).

Metal Designs—(Additive) Manufacturing Challenges and Solutions— LEO Lane, http://www.leolane.com/blog/metal-designs-additive-manufacturing-challenges-solutions/, accessed Apr. 1, 2019, pp. 1-12.

Cooper et al., Three-Dimensional Printing GRCop-42, https://ntrs.nasa.gov/archive/nasa/casi.ntrs.nasa.gov/20190001243.pdf, Dec. 2018, pp. 1-20.

Loucas Papadakis et al., On the energy efficiency of pre-heating methods in SLM/SLS processes, Int J Adv Manuf Technol (2018) 95:1325-1338, Published Nov. 9, 2017, https://doi.org/10.1007/s00170-017-1287-9, Springer-Verlag London Ltd. 2017, London, UK.

Bradley Richard et al., Loop Heat Pipe Wick Fabrication via Additive Manufacturing, Advanced Cooling Technologies, Inc., Lancaster, PA, 17601, 48th International Conference on Environmental System, ICES-2018-6, Jul. 8-12, 2018, https://1act.webpagefxstage.com/wp-content/uploads/2018/09/LHP-Wick-Fabrication-via-Additive-Manufacturing.pdf, Albuquerque, New Mexico. (Note: Reference Date Post Dates Filing Date of U.S. Appl. No. 62/651,196.).

DMG MORI, New method of manufacturing using powder bed: Additive Manufacturing with Selective Laser Melting; Youtube Video, https://www.youtube.com/watch?v=te90aSZOkf8, publication date: Feb. 16, 2017. (Screenshot attached—Nothing relevant outside of screenshot.).

Bradley Richard et al., Loop Heat Pipe Wick Fabrication via Additive Manufacturing, Advanced Cooling Technologies, Inc., Lancaster, PA, 17601, 47th International Conference on Environmental Systems (ICES 2017), Jul. 16-20, 2017, https://1act.webpagefxstage.com/wp-content/uploads/2017/07/LHP-via-Additive-Manufacturing-ACT-ICES-2017.pdf, Charleston, South Carolina.

Bradley Richard, et al., Loop Heat Pipe Wick Fabrication via Additive Manufacturing, Advanced Cooling Technologies, Inc., Lancaster, PA, 17601, 19th International Heat Pipe Conference, Jun. 10-14, 2018, https://1act.webpagefxstage.com/wp-content/uploads/2018/06/LHP-Wick-Fabrication-via-Additive-Manufacturing.pdf, Pisa, Italy. (Note: Reference Date Post Dates Filing Date of U.S. Appl. No. 62/651,196.).

* cited by examiner

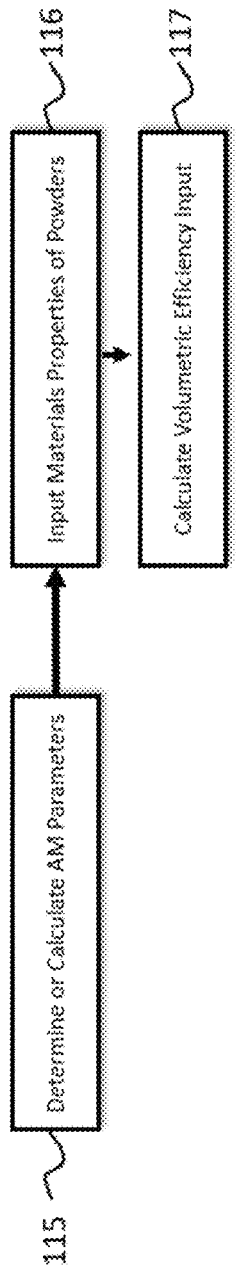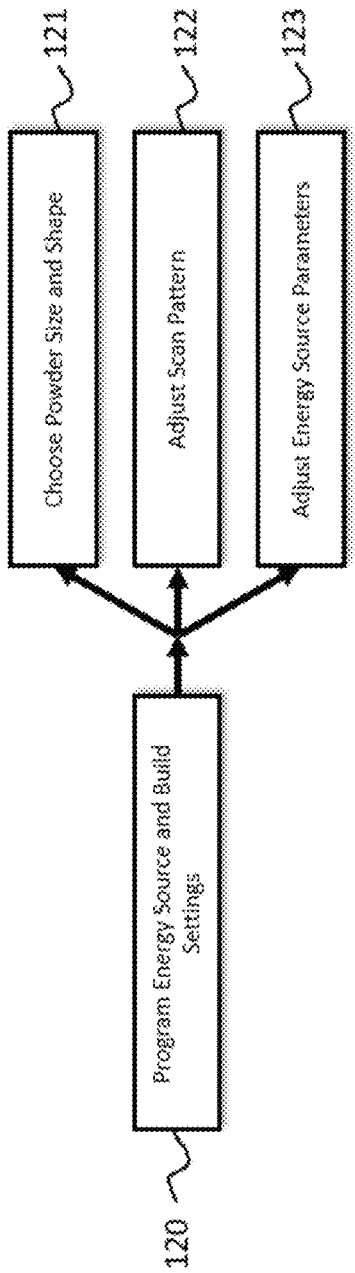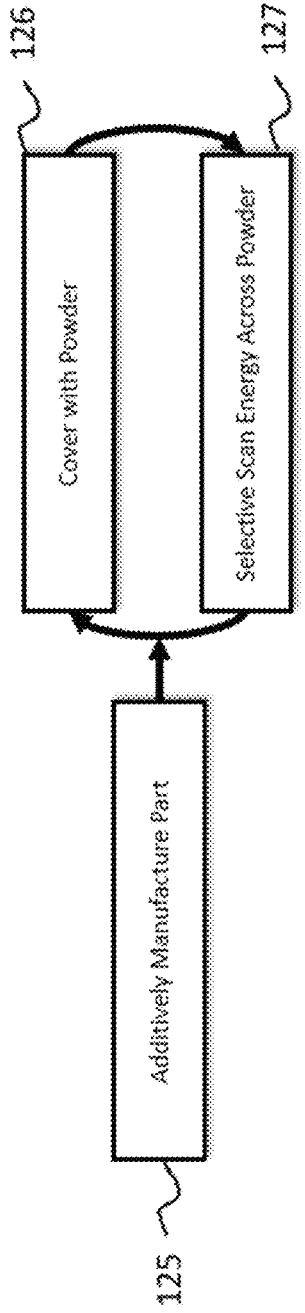

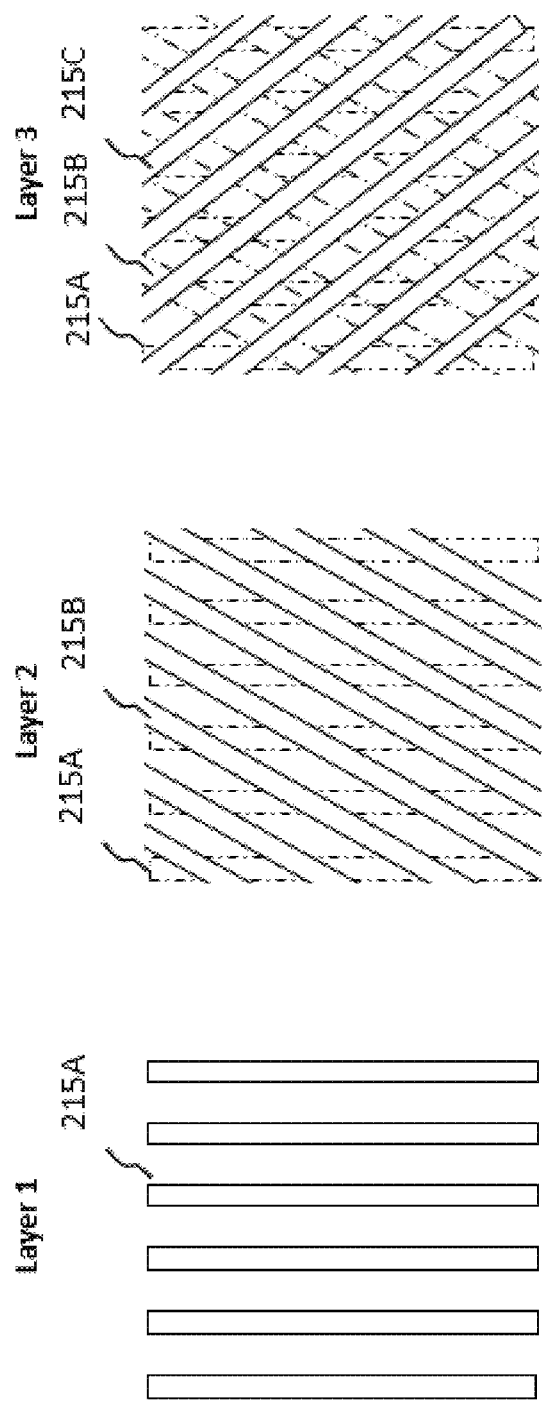

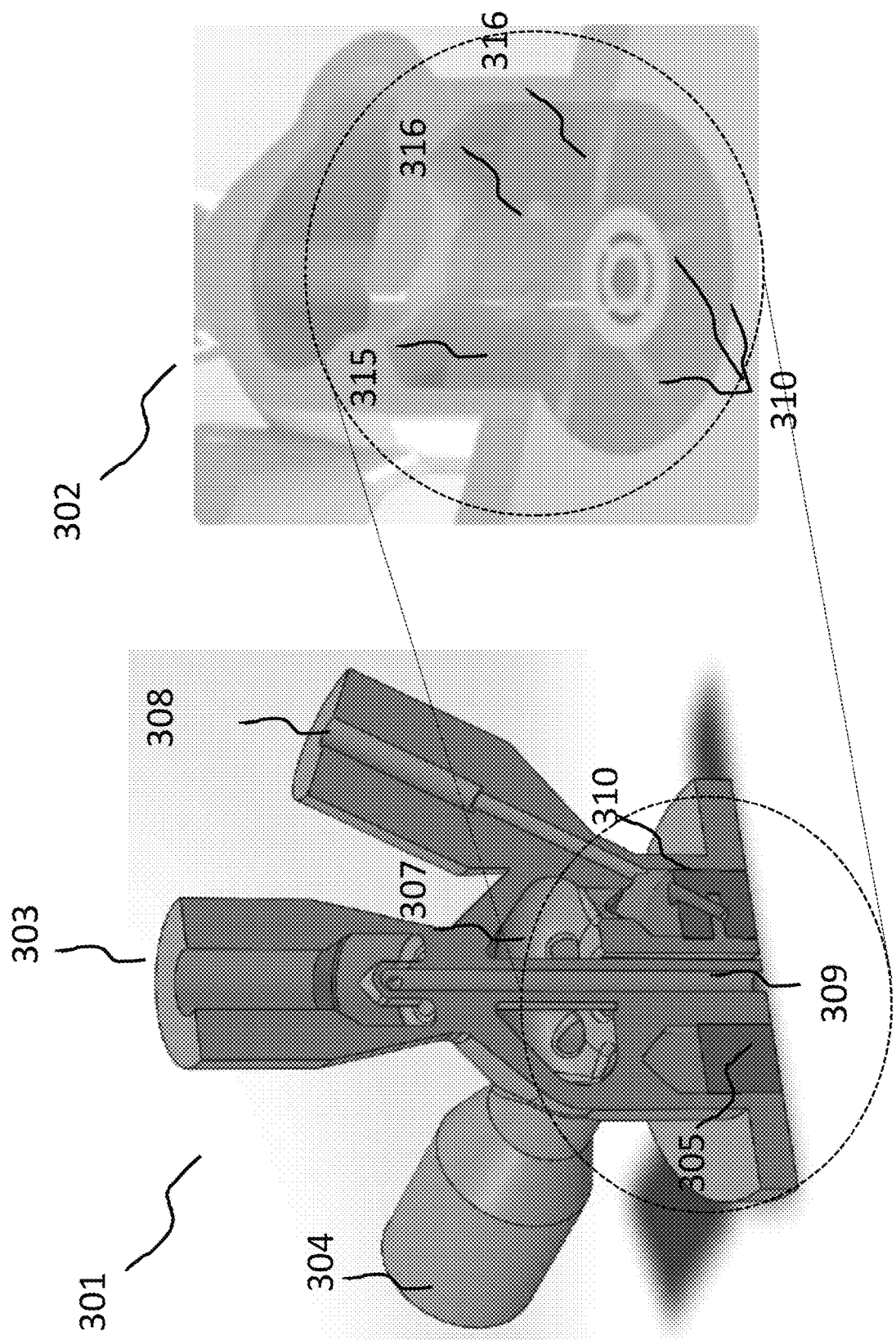

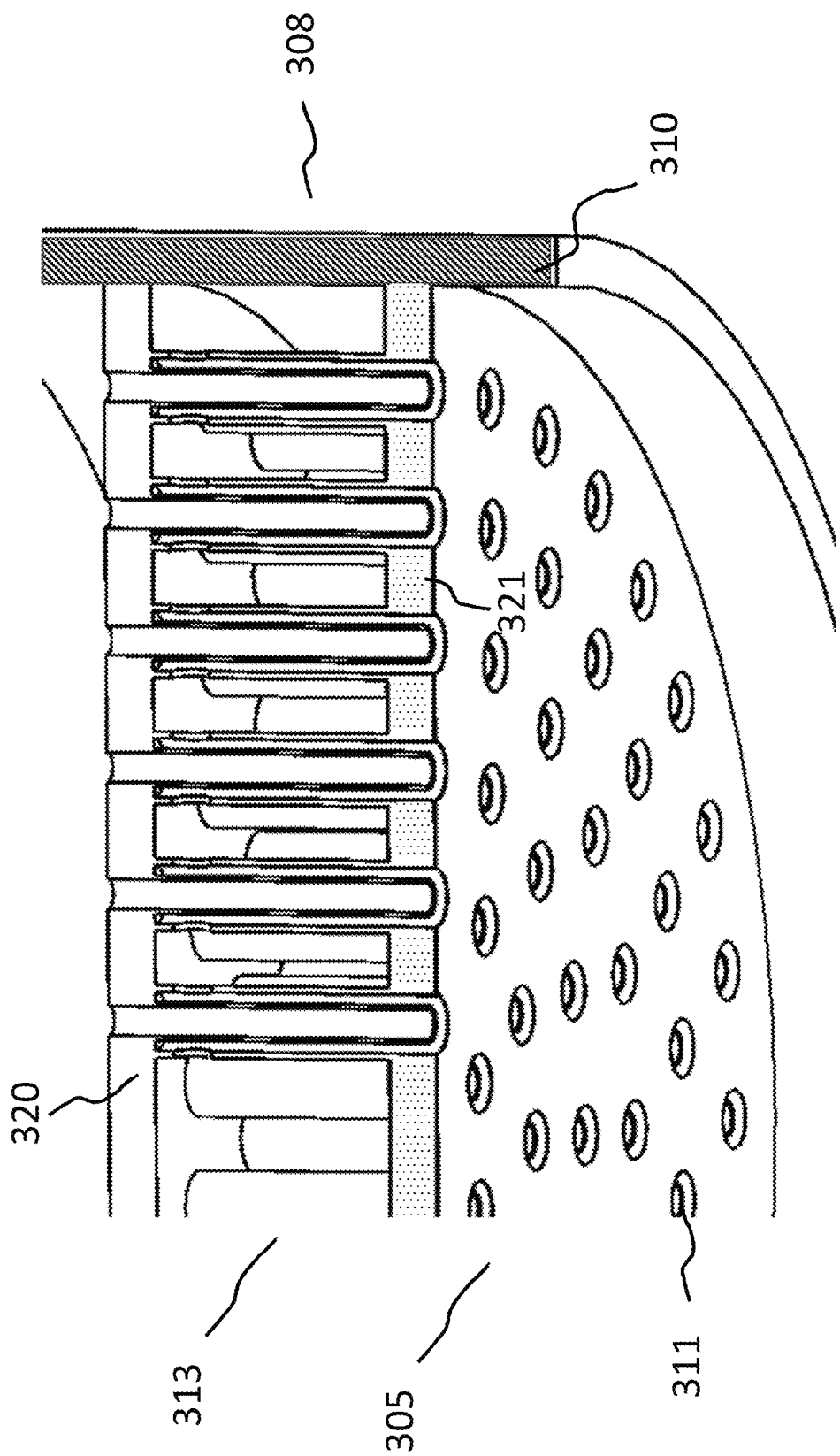

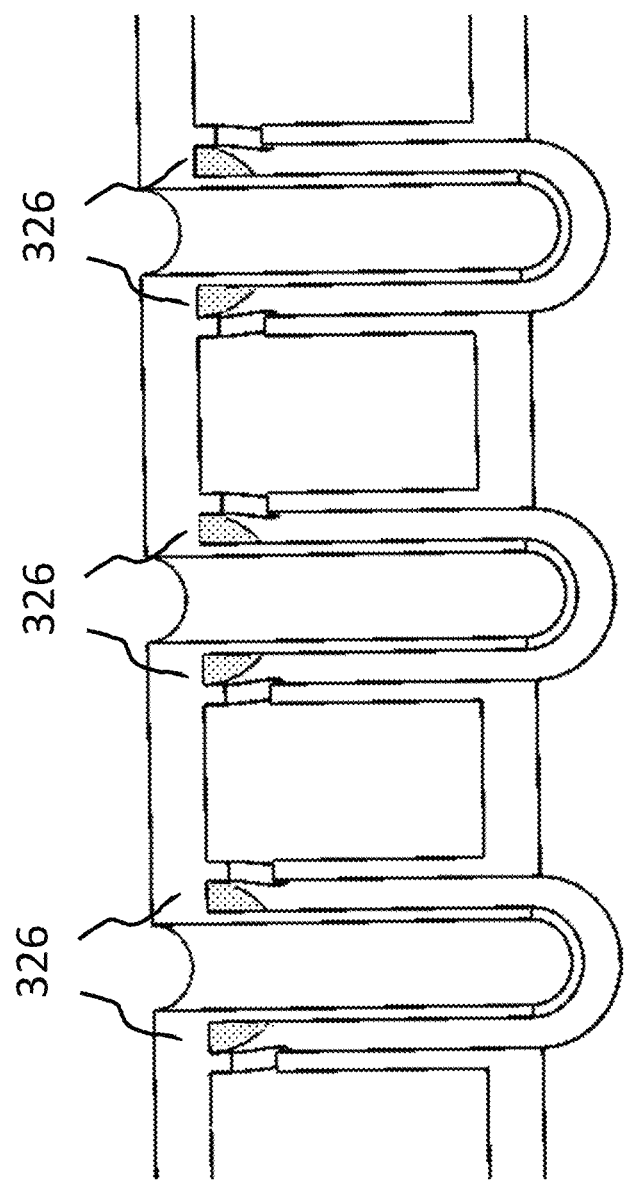

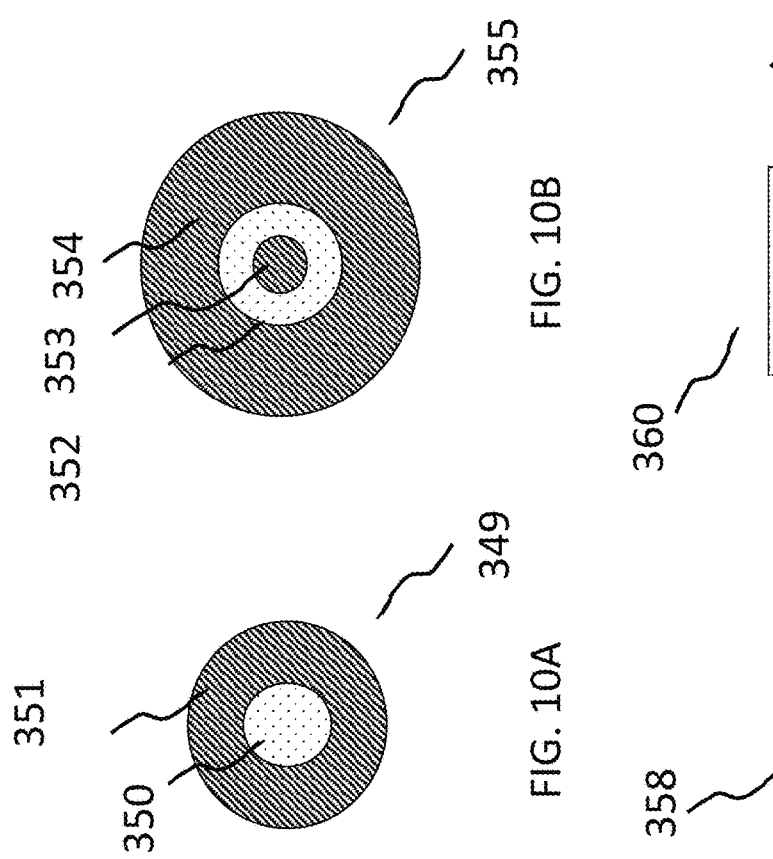

ADDITIVELY MANUFACTURED NON-UNIFORM POROUS MATERIALS AND COMPONENTS IN-SITU WITH FULLY MATERIAL, AND RELATED METHODS, SYSTEMS AND COMPUTER PROGRAM PRODUCT

CROSS REFERENCE TO RELATED APPLICATION

This application is based on and claims the benefit of priority to U.S. provisional patent application Ser. No. 62/651,196 filed on Apr. 1, 2018.

INCORPORATION BY REFERENCE

The entire contents of U.S. provisional patent application Ser. No. 62/651,196 and U.S. patent application Ser. No. 15/070,514 (different but overlapping inventorship with the present application) including the respective specification, claims and drawings are incorporated herein in their entirety.

TECHNICAL FIELD

The present disclosure relates to the additive manufacturing ("AM") of porous materials.

BACKGROUND

Additive manufacturing methods have been around for decades. Over this time, the price per part has decreased enough to make additive manufacturing competitive for parts with high complexity and low production volumes. Additive manufacturing, or commonly known as 3D Printing, is an economical alternative to other manufacturing methods.

Powder-based additive manufacturing works by covering a layer with powder feedstock and applying an energy source such as a laser or an electron beam across the layer of powder to sinter or melt the powder. When this process is performed over successive layers, a part can be built up and manufactured in a desired shape and volume. When a laser is used for metal powders, this process can be called selective laser sintering/melting or direct metal laser sintering/melting or laser powder bed fusion.

SUMMARY

The goal of additive manufacturing is typically to sinter or melt the layers enough to remove porosity and achieve a fully dense part to mimic the performance of traditionally manufactured materials, as porosity is something that is considered to provide mechanical weakness or crack susceptibility. As such, few adequate methods have been developed to introduce controlled porosity into additively manufactured parts.

Applicants conceived of using additive manufacturing to manufacture complex parts for aerospace applications requiring small scale open porosity through which gas and fluids can flow or requiring closed porosity for dampening, or both, and needed methods to define, build and control porosity in an additive manufacturing setup. Such methods did not exist until now.

In addition, additive manufacturing workflows usually involve importing a computer-aided drawing ("CAD") file into the additive manufacturing machine. However, reaching Applicants' goal of modeling this porosity into a CAD file would result in an unwieldy CAD file and overwhelm the processing capabilities of most additive manufacturing setups. Applicants have figured out how to be able to build a complex part with non-uniform porosity by developing modifications to a typical additive manufacturing setup. In this way, manufacturers can economically produce parts with non-uniform porosity.

Applicants can use their methods and systems to tune the porosity to specific technical applications to address problems.

A first example embodiment is an additive manufacturing method. It includes the following steps of determining a desired non-uniform porosity profile across a part to be manufactured; calculating and programming for the desired porosity profile, based at least on the size and materials characteristics of powder in a powder source, energy source settings and a build profile for the part to be manufactured; covering a surface with the powder from the powder source; scanning selectively the energy with the laser settings and build profile at least once across the powder to at least partially sinter or at least partially melt the powder exposed to the energy and at least partially bind the powder with prior layers and adjacent areas; and repeating the covering and scanning steps to build the part layer by layer, where the surface becomes the prior layer on the second and successive covering steps. In this embodiment, the step of scanning can create a porous region in the part at first energy source settings and a first build profile, a denser region in the part at second energy source settings and a second build profile, and a full penetration mechanically bonded interface between the porous region and the denser region. Additionally, the first build profile and the second build profile can have relatively no scan separation distance between them at the full penetration mechanically bonded interface. Optionally, the step of scanning can create the full penetration mechanically bonded interface using a scan strategy that overlaps the first build profile to the denser region and the second build profile to the porous region to the interfacing areas of the regions proximate to the interface. Another variation is that the step of scanning creates a third region of the part that is fully dense, the denser region has a porosity higher than a porosity of the fully dense region. Another option is the build profile informing the step of scanning to make one pass that substantially overlaps the second pass to cause the present layer to bind to the prior layer without overheating the top of the layer to cause the porosity to decrease to less than the build profile. Another variation is that the build profile informs the step of scanning to make non-overlapping passes to create lattice-like wire-like lines in a layer in a first direction and a lattice-like wire-like lines in a subsequent layer in a second direction at an angle to the lines in the layer. A further variation is that the step of scanning makes channels resulting from the wire-like lines across successive layers building a lattice-like structure, and the step of scanning plugs channels at random to control flow through the lattice-like structure. Another option is that the step of scanning skips the wire-like lines in at least an area of at least one layer to enable flow through the skipped area in that layer in a direction parallel to the at least one layer, and the skipped area in the at least one layer is sandwiched in between lattice-like structures in other layers. Another variation is that the step of scanning makes at least some of a first pass that substantially overlaps at least some of a second pass at a first energy level to create a porous region and another section of the first pass at a second energy level to create a fully dense region, wherein the first energy level is lower than the second energy level. Optionally, the step of scanning makes at least some of a first pass that substantially overlaps at least some of a second pass at a first scan speed to create a porous region and another section of the first pass at a second scan speed to create a fully dense region, wherein the first scan speed is faster than the second scan speed. The porous area may be structurally supported by the denser area.

Also described herein are parts made by the method above. For example, Applicants describe an injector for a rocket engine including a porous disk and a fully dense exterior. A variation is that the porous disk has a different porosity on a combustion chamber facing side of the disk than the porosity on a side of the disk opposite to the combustion chamber facing side. Another example is that the part is a combustion chamber line or a hot wall for a rocket engine. Another example is that the part is a valve, and the porosity is manufactured into the valve seat to tune the coefficient of thermal expansion enabling the valve to maintain a seal over significant temperature swings. Another example is that the part is a filter.

Also described herein is another exemplary embodiment of additively manufactured material. The material includes a multi-layered material of at least one of metal, alloy, metal matrix composite, cermet or ceramic, that has been built up by successive passes of energy from an energy source on powder from a powder source of an additive manufacturing process; a first region of the material being porous; and a second region of the material being dense, wherein the first region has a tuned porosity controlled by the powder particle size and the degree of sintering, and a full penetration mechanical bond at least partially connects the first region to the second region. The material may have the first region has a pore size based on the interstitial space between sintered particles between 1 and 50 microns. The material may also have un-sintered powder remaining in pores in the porous region. Optionally, bound parts of the porous region may never receive any direct energy from the energy source. Another variation is that at least some of the pores in the porous region are in multilayer channels created by a hatch scan pattern wherein the angle of each layer's hatch pattern is rotated from the prior layer's hatch pattern. Another variation is that the second region contains lattice-like structures comprised of relatively high density wire-like lines that are connected in three dimensions in a pattern that forms a grid, helical, or pseudo random network of pores to produce a structure with both sufficient mechanical strength and controlled fluid flow paths. Another variation is that the hatch pattern scans are fully dense and the porosity of the area in between the fully dense portions of hatch pattern scans is in the range of 10-15% open porosity. Another variation is that at least some of pore channels in the porous region are created from impregnated material or reaction residuals that have been removed in a post additive manufacturing step. Another example is the material used in the disk of an injector of a rocket engine, wherein the pore channels are oriented to be substantially perpendicular to the radius of the disk.

Another exemplary embodiment is an injector for a rocket engine created by an additive manufacturing process. The injector includes a porous disk that is circumferentially surrounded by and integrally connected by a full penetration mechanically bonded interface to a fully dense exterior of the injector, wherein the porous disk and fully dense exterior are bound together through the additive manufacturing process. Another example is where the a porosity of the porous disk is tuned to provide acoustic dampening of greater than 0.1%. Another example is where a porosity of the porous disk is tuned to provide a pressure wave response. Another example is where an outer layer of the porous disk has a lower porosity than an inner layer of the porous disk that provides the rocket engine with acoustic dampening of resonance frequencies through porosities of the outer layer and inner layer that are tuned to the resonant frequencies of the rocket engine. Another example is where the porosity of the outer layer is 0-10% and the porosity of the inner layer is 10-20%. Another example is where the porosity of the porous disk is greater on one side than the other side to provide film cooling. Another example is where a porosity of the porous disk from a manifold of the injector to the combustion chamber is tuned to provide regulation of a volume of cooling flow. Another example is where the scanning creates fully dense stiffening members on the fuel manifold side of the porous injector disk or internal to the porous injector disk. Another example is where the scanning creates baffles with porosity on the gas side of the porous injector disk, wherein the porosity in the injector disk is tuned to dampen out longitudinal combustion instability while the porosity of the baffles is used to dampen out radial modes of combustion instability. Another example is where the baffles additionally have porosity through which fluid can flow resulting in prevented melting during operation by a mechanism of transpiration cooling. Another example is where an injector element at the top of the nested tube assembly of the injector contains porous material tuned to frequencies to dampen out organ pipe modes of a specific engine configuration. Another example is where the porous disk has internal stiffening regions. Another example is where the porous disk has regions of preferential fluid flow to areas of the porous disk that benefit from additional transpiration cooling.

Another exemplary embodiment is a computer program product stored in a computer readable medium for controlling an additive manufacturing machine. The program product contains the steps of requesting from a user a desired non-uniform porosity profile across a part to be manufactured; storing the desired non-uniform porosity profile into machine-readable memory; calculating for the desired porosity profile, based at least on the size and materials characteristics of powder in a powder source, laser settings and a build profile for the part to be manufactured; programming the laser settings and the build profile into memory; instructing the additive manufacturing machine to perform the steps of: covering a surface with the powder from the powder source; scanning selectively a laser with the laser settings and the build profile at least once across the powder to at least partially sinter or at least partially melt the powder exposed to the laser and at least partially solidify the powder with prior layers and adjacent areas; and repeating the covering and scanning steps to build the part layer by layer, where the surface becomes the prior layer on the second and successive covering steps, wherein the step of scanning creates a porous region in the part at first energy source settings and a first build profile, a denser region in the part at second energy source settings and a second build profile, and a full penetration mechanically bonded interface between the porous region and the denser region, and the first build profile and the second build profile has relatively no scan separation distance between them at the full penetration mechanically bonded interface. Another example is an additive manufacturing apparatus that includes a controller, memory and powder based additive manufacturing operations, the controller implementing the computer program product above.

Another example embodiment is an additively manufactured wall of a rocket engine. The wall includes a high porosity layer sandwiched in between a dense layer on a hot wall on the rocket engine and fully dense layer for structural support, wherein each interface layer between porosity levels includes a full penetration mechanically bonded interface; and a regenerative cooling channel configured to allow transpiration cooling flow of around 0.1% to 5% fluid flow through the channel. Another example includes acoustic control and film cooling features inside the wall.

Another exemplary embodiment is a rocket engine containing the above injector with a face plate having a gradient of porosity configured to cause a pressure drop.

Another example embodiment is the atmosphere for additively manufacturing the part is a reactive gas relative to the chemical reactions occurring in the manufacturing chamber. Another example embodiment is a computer program product stored in a tangible medium that is configured to instruct a controller for an additive manufacturing machine to implement the above method.

BRIEF DESCRIPTION OF THE DRAWINGS

The accompanying drawings, which are incorporated in and constitute a part of this specification, illustrate examples, and together with the description, serve to explain the principles.

FIGS. 2A-2D are flow charts illustrating an exemplary embodiment of a method used to additively manufacture parts.

FIGS. 7A-7C are illustrative examples of how scan vector lines can change angles with each layer.

FIG. 8A is an exemplary fuel injector for a rocket engine that can be additively manufactured according to the present embodiments. FIG. 8B is a similar file injector that has a disk with stiffening members.

FIGS. 9A-9F show parts of a coaxial injector porous disk assembly for injector and rocket engine embodiments. FIGS. 9A and 9B are perspective and front views of rocket engine coaxial injector face, with the combustion chamber removed, that can be additively manufactured according to the embodiments herein. FIG. 9C is an exploded upper perspective cross-sectional view illustrating a rocket engine coaxial injector head, with fuel (lower) and oxidizer (upper) manifolds. FIG. 9D is an exploded lower perspective cross-sectional view illustrating a rocket engine coaxial injector head, with fuel and oxidizer manifolds. FIG. 9E is an overhead view of a section of a porous disk showing damping baffles. FIG. 9F is a view of the coaxial tubes with a porosity-tune element in another embodiment.

FIGS. 10A and 1013 are diagrams illustrative how porous material can be wholly within or wholly surround fully dense material. FIGS. 10C and 10D illustrate how layers of different density and porosity can be used together or change gradually.

Regarding the Figures, diagonal hatching is shown in some of the photos to represent fully dense material and a speckled pattern is shown to represent porous areas, with increasing density of speckling representing decreasing porosity. However, the lack of marking of an image in this way does not mean that materials shown in the Figures or even in the same photo are neither fully dense nor porous.

DETAILED DESCRIPTION

Example embodiments in general relate to an additively manufactured porous material, trade name permiAM, and more specifically it relates to an additively manufactured non-uniform porous material in-situ with fully dense material for the in situ additive manufacturing of both porous and fully dense material in the same part such that no secondary process is required.

An example embodiment is directed to a permiAM which includes additively manufactured (AM) porous material which can be tuned for porosity and density, can be built in situ with fully dense material, and may also be tuned for response to pressure waves.

Figure 1:
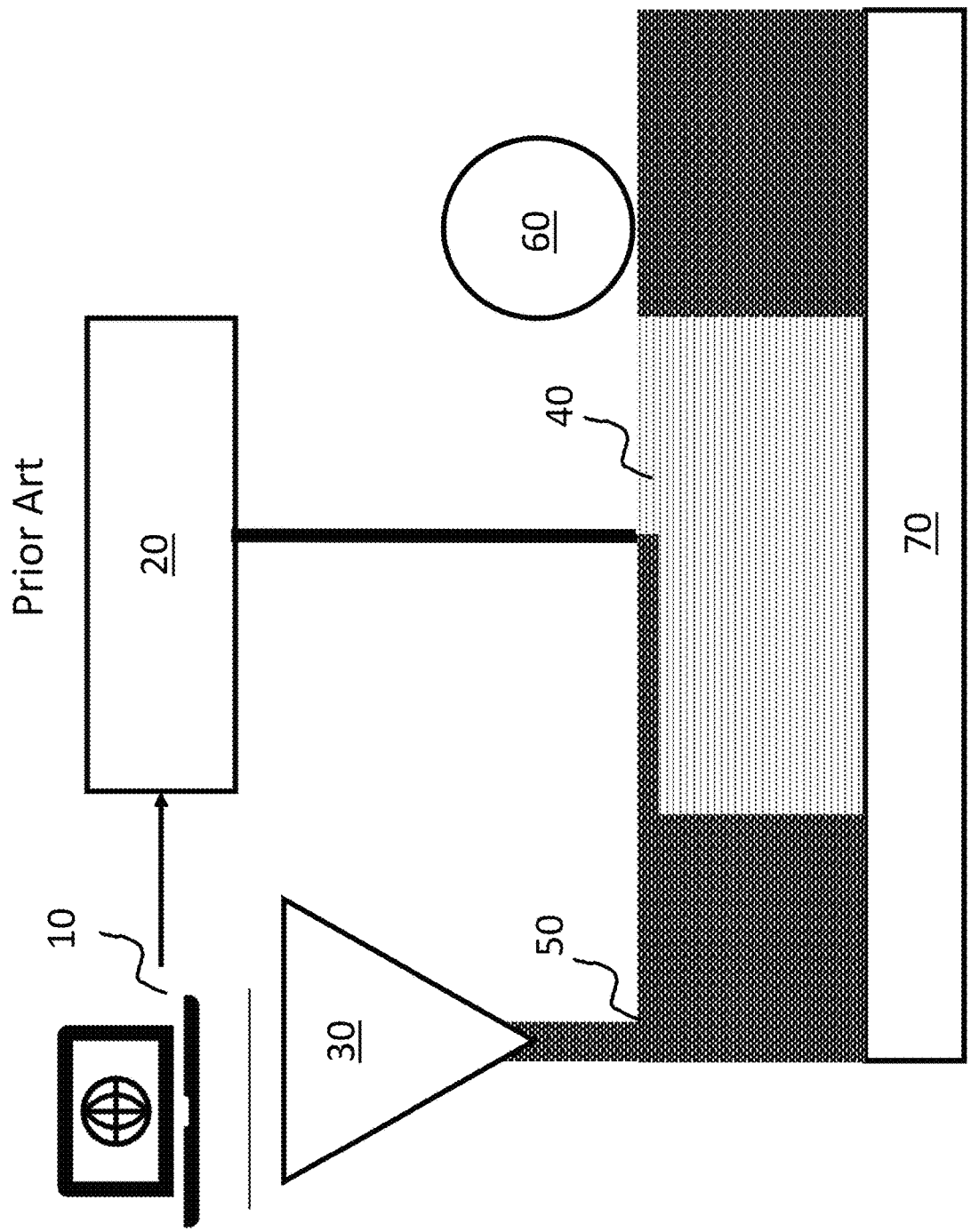
FIG. 1 is a diagram of a typical selective laser sintering machine that could be found in the prior art.
Figure 2A:
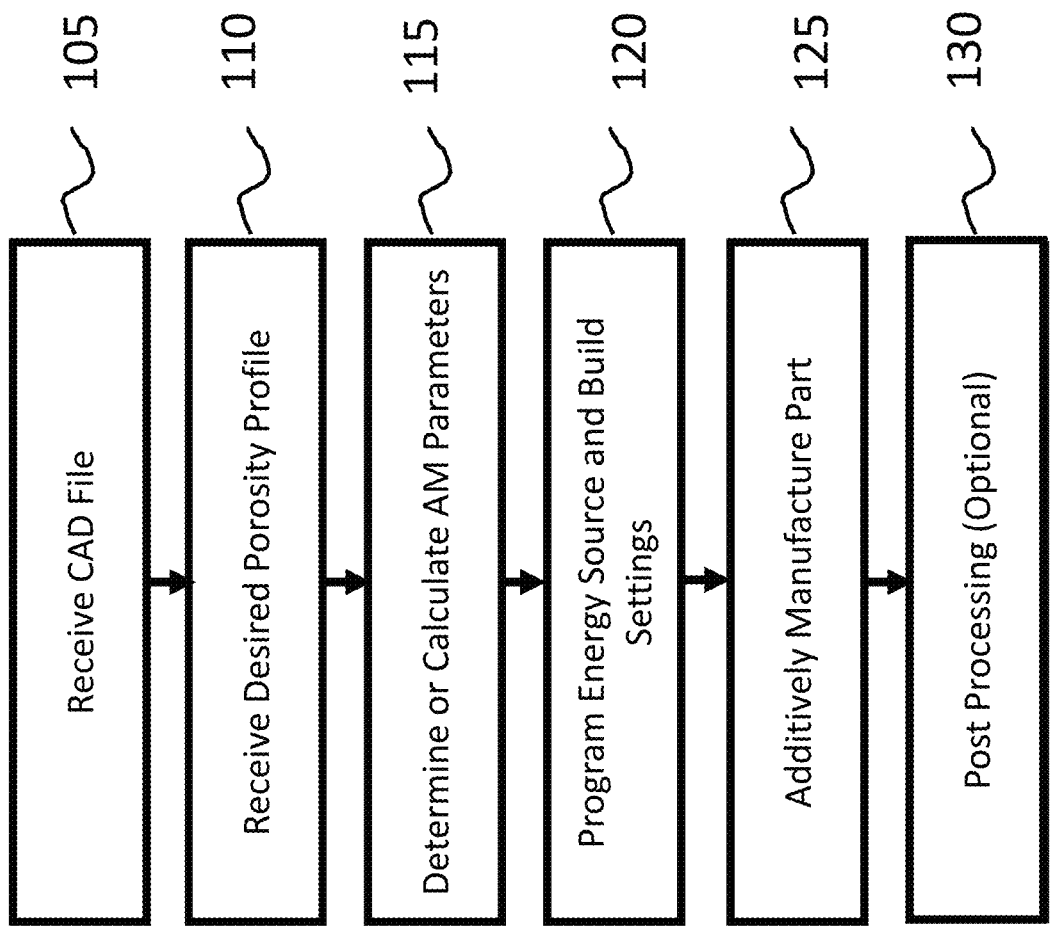

FIG. 1 illustrates a typical AM setup that could be off-the-shelf. For example, Applicants have been using an EOS M290 system. It includes a computer 10, energy source 20, powder source 30, multilayer part 40, unsintered feedstock powder 50, roller 60 and moveable platform 70. The computer 10 generally feeds into the system a CAD file. An AM machine controller (not shown) in the system in FIG. 1 instructs the powder source 30 to deposit a layer of powder onto a platform. A roller 60 ensures the powder has an even thickness. The controller instructs the energy source 20 to energize. The scanning module (not shown) would help the energy source 20 emit energy that is rastered across the platform 70 containing the powder 50 to build a first layer of a part. Then this process repeats to build subsequent layers until the part is complete.

Directed energy source 20 could be laser, electron beam or another form of energy source that is capable of being applied in a raster pattern to cause powders to fuse or melt into a solid material.

The rasterizing of the energy source can be achieved through a micro scanner (not shown), motorized moveable platform 70 or other means. Moveable platform 70 also can move up and down to keep the energy source/powder exposure area at a consistent location as the AM part is built layer by layer.

The powder source 30 is a bin, hopper or AM machine feeding tube that provides enough powder for the part. It has a piston or other mechanism for controlling the release of the powder 50 to the build site.

Powder bins selectively release powder onto the platform or the top most layer of the part. The powder bins may contain the same powder or different powders based on the needs of the part. The locations of these parts can move relative to each other or be designed differently within a larger chamber that is usually filled with an inert gas.

The powder 50 includes whatever the user adds to the machine.

The computer will have typical personal computer desktop components such as a controller, a display, random access memory, non-volatile storage, and communications system such as a universal serial bus, a network interface and peripheral interfaces.

Although not shown, the AM process typically takes place in a chamber into which an inert gas like argon is commonly used. This may be in combination with a vacuum or partial vacuum. In addition, heaters (not shown) may be used to keep the chamber or a specific area at a specified temperature.

A laser powder bed fusion printer uses a scanning laser system to selectively fuse powder one layer at a time to create a 3d part. The printer processing conditions are typically developed for each material. The combination of parameters, such as, but not limited to, laser power, travel speed, hatch spacing, and layer thickness, must be determined for a new material to produce the results you like. Laser energy needed to fuse aluminum is different than that required to fuse steel which is again different from that required to fuse tungsten.

Commercial printers often include "parameter sets" developed by the manufacturers for a handful of materials. These parameter sets can be thought of as similar to a traditional printer driver, but this is a simplification. A material can be selected in software to choose the correct parameter set for the desired material. Most manufacturers also give customers the ability to edit the parameter set to adapt for their own printing needs. Applicants use this editable parameter functionality to print the material in a non-standard way that results in the benefits discussed herein including, but not limited to, controllable porosity and tortuosity. The exact combination of customized parameters to produce the desired results are still material specific.

Each manufacturer may have slightly different "official" names for the variables. Key variables for the methods within are generally known as laser power (common units: Watt), laser travel speed (common units: mm/s), laser line spacing distance (common units: mm or microns). Laser spot size is also a relevant variable although not all systems readily allow control of this. Additional variables include layer rotation angle (common units: degrees) and offset distance (common units: mm) relative to the previous layer. Layer thickness (common units: mm or microns) is also important. Another variable Applicants have used is skipping exposure of layers for the wire-like network structure. Skipping layers allows fusing the exposed pattern every other layer or every third layer or every 5th or 10th layer, for example. With a combination of FIGS. 5B and 5C strategies (discussed below), Applicants may partially melt/sinter all of the powder in the designated porous area every layer while also forming the reinforcing patterned structure with skipped layers in between to allow more in-plane (XY-direction) flow.

A typical process flow for an AM machine user is to open printer control software, load in a CAD model (the CAD model may potentially be in STL format or another format that is compatible with the printer software), and then either select a standard material parameter set, or enter in custom parameters to produce the results you want. An STL file is a CAD file and contains only the model information. STL is one file format that is commonly used for 3D printing, but it is not the only file format used for 3d printing and Applicants' claims are not limited to the STL file format. Applicants have developed methods for using custom parameters to produce controllable and useful porosity where desired together with dense material where desired, often using typical parameters for the dense material.

The existing typical process flow has limitations because of CAD model complexity. The more surfaces/polygons/voxels/etc. that a CAD file has, the more intensive it is on the computer. Complex models can therefore become very hard to work with. A model with a lot of lattice structures can be much more complex than a solid part of the same outer geometry. Some software companies have developed methods to make it possible to use lattice structures through their own CAD based innovations by taking advantage of the lattice repetition to simplify the processing. However, if the porosity is randomly distributed or otherwise not a repeating lattice these methods are not known to work. Even with using the advanced CAD methods for lattices, the models still tend to get very large and hard to work with even on high end workstation computers. Applicants' bypass this CAD model complexity to introduce the complex porosity by changing the laser scan strategy and other parameters and inputs that are used in the AM process to produce the part.

Applicants' techniques can use simple solid CAD models and introduce the porosity through the print "driver" parameters. Introducing complex lattices or porosity through the CAD model can quickly overload even high-end CAD workstation computers and software to the point that the model becomes unresponsive or crashes the software. The CAD model approach therefore requires expensive software, powerful computers beyond typical desktop systems, and can drastically slow design due to the slow model responsiveness as well as the work required to design the porosity into the model. Applicants' approach doesn't have these limitations and can generate more fine-featured structures than would otherwise be possible through CAD design. For example, and in contrast to a complex CAD model, Applicants' CAD file can be a simple cube with 6 sides and a solid interior volume. This is very simple both for the CAD designer and the CAD software and computational requirements. Applicants can then introduce the porosity into the cube through the print process.

If different regions of different porosity or solid structures are desired, Applicants can address this in multiple ways. For example, Applicants can use a CAD model that has the different regions separated into different connected models. For example, the cube could have an outer border that is dense with a porous channel. This approach is still far simpler than the traditional approach of modeling all porosity along with the limitations on feature size of the traditional approach. In another example, Applicants' can use parameter features that allow separation of the model by layer and by distance from a part surface. This eliminates the need to modify a simple CAD model for the most common types of different porosity regions that would be desired. Additionally or alternatively, multiple contour parameters designed to give good surface finish can be introduced in a partially overlapping manner inward from the surfaces with each contour line using its own laser power and travel speed settings to allow parameter variation on a small scale and therefore a smoothly graded porosity.

Applicants FIGS. 2A-2D show an exemplary method to AM a part. In Step 105, a CAD file is received by a user or taken from storage. As mentioned above, this need not be a complex CAD model. In Step 110, porosity requirements or a porosity profile are received by the user. Then, in Step 115, AM parameters needed to achieve that porosity using the teachings herein are determined based on prior experimentation or are calculated using materials characteristics in Step 116 and first principles in Step 117. Then, in Step 120, these parameters are programmed into the printer settings, as discussed above. Powder size, type, wettability and shape (e.g., angular, irregular, sponge-like, or spherical) is chosen in Step 121. The scan pattern is set in Step 122. And the energy source settings are set in Step 123. Then, in Step 125, the part is additively manufactured, layer by layer. This covers by covering with a powder in Step 126 and scanned with the energy from the energy source in Step 127. Once AM is complete, then an optional post processing in Step 130 is performed. Post processing 130 may be annealing, hot isostatic pressing, shot peening, polishing, or any other process appropriate for a specific part.

The lasers could be any lasers that are capable of being used in additive manufacturing including ytterbium fiber, YAG Lasers, diode lasers, and CO2 lasers.

Beyond this, the detail a laser fusion printer can achieve is limited by the laser focal size, melt pool size, etc. Typical minimum feature sizes for commercial additive manufacturing machines of this type are around 250 µm. In contrast, Applicants' methods of porosity production can overcome these limitations through partial fusion of the powder at a smaller scale than the laser spot size or melt pool size. The laser can be controlled more precisely than the spot size or melt pool size. The powder size and shape can also be controlled. This results in a tunable porosity resulting from, among other things, the interstitial spaces between the powders that can be adapted to different applications.

Figure 4:
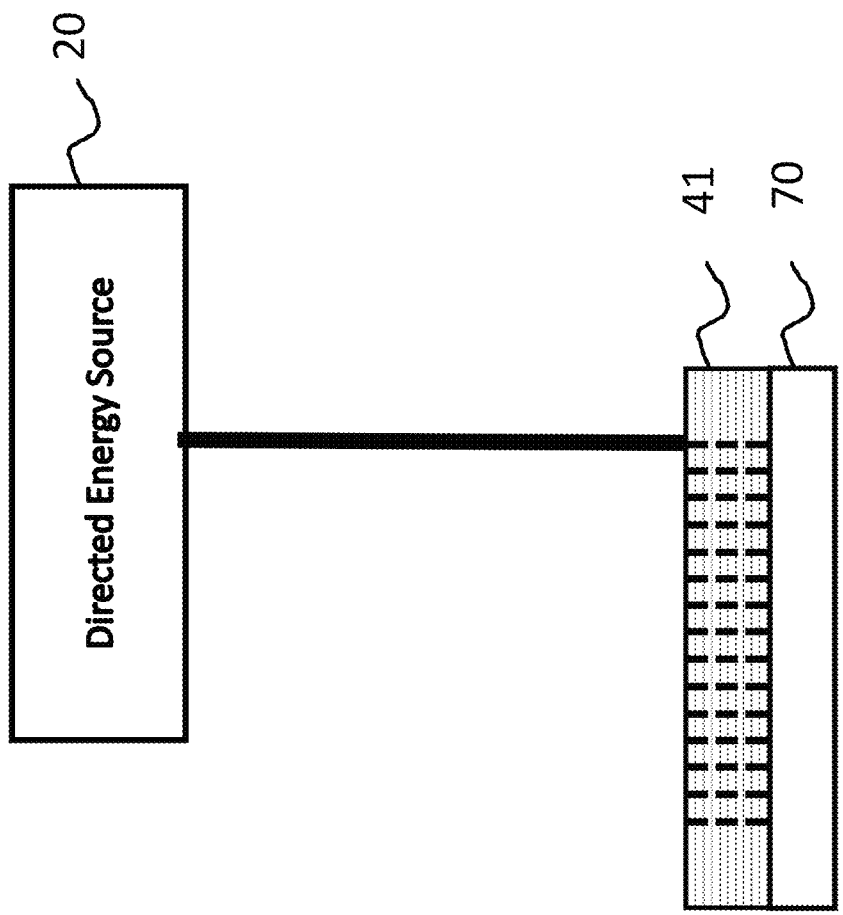
FIG. 4 is a schematic that illustrates how vertical channels can be built up over several layers using an exemplary embodiment.
Figure 5C:
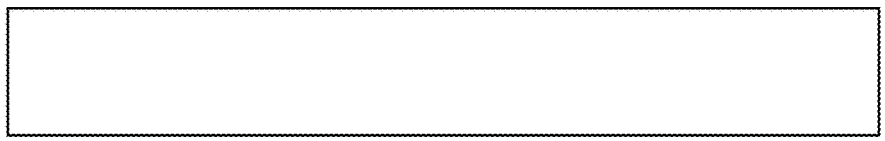
FIGS. 5B and 5C illustrate exemplary embodiments of scan vector configuration.
Figure 5B:
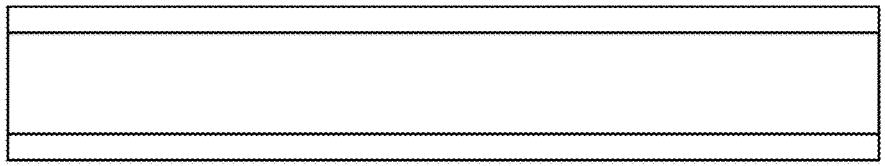
Figure 5A:
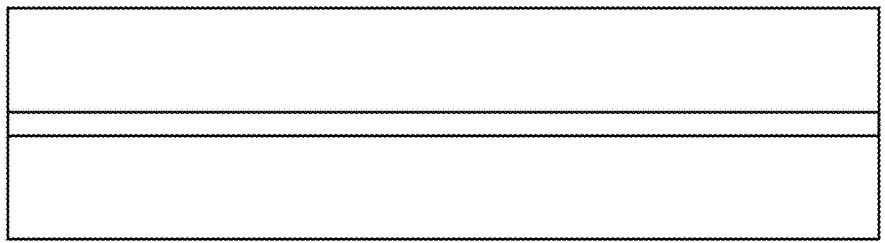
FIG. 5A shows a "standard" pass of an additive manufacturing machine using the default settings.

The additive manufacturing machine of FIG. 1, under its default or standard settings, would make two consecutive passes of scan vectors similar to that shown in FIG. 5A. The manufacturers goal would be to have a first pass ("A Pass") and then a slightly overlapping second pass ("B Pass") at an energy level to fully densify the scanned area and the overlap ensures consistent and complete sintering/melting to achieve a fully dense material. FIG. 4 is a simplistic representation, using the machine of FIG. 1 as an example, of how the same area across layers can be scanned with the energy from energy source 20 and built up with each layer connecting each other in part 41.

In addition to changing other settings, Applicants have different scan vector strategies to build-in different types and sizes of porosity in an AM material. The regions exposed with each exposure type can be controlled by using model sections, or by using offset parameters that allow control from outer edges. An exemplary scan vector strategy is shown in FIG. 5B, demonstrating a scan strategy of two lower energy absorbed scan vectors A Pass and B Pass with substantial overlap. The energy absorption is lowered by a faster scan speed or reduced power. The initial energy absorbed helps to spread more even energy through the scan area to, by the end of the second pass, at least partially fuse or sinter the powder including to the layer below. This strategy forms the porosity by either partially melting the powder or partially solid state sintering the powder so as to create a network of powder particles that are bound together by joined/necked contacting areas. Forming this porosity requires a significantly different laser strategy that that of FIG. 5A. Instead of melting a line of material and then another partiality overlapping line next to it, as shown in FIG. 5A, the FIG. 5B strategy typically moves the laser much more quickly across the powder so as to not fully melt it and then the next line is substantially overlapping the previous line. This creates a pre-heat energy build up that allows the powder to have appropriate temperatures and time to partially sinter. Since each layer of powder has a thickness to it, this method allows the powder to be heated by the laser directly on the surface while giving time for the energy to propagate to the bottom of the layer as well without overheating the top. Taken together with the parameters discussed above, the FIG. 5B strategy enables Applicants' to finely control the porosity in a material to the needs of the application. This method results in random interconnected pores in between the partially fused powder particles. As porosity levels increase, the material gets mechanically weaker and more greatly benefits from the support of denser material if available.

Figures 6A, 6B:
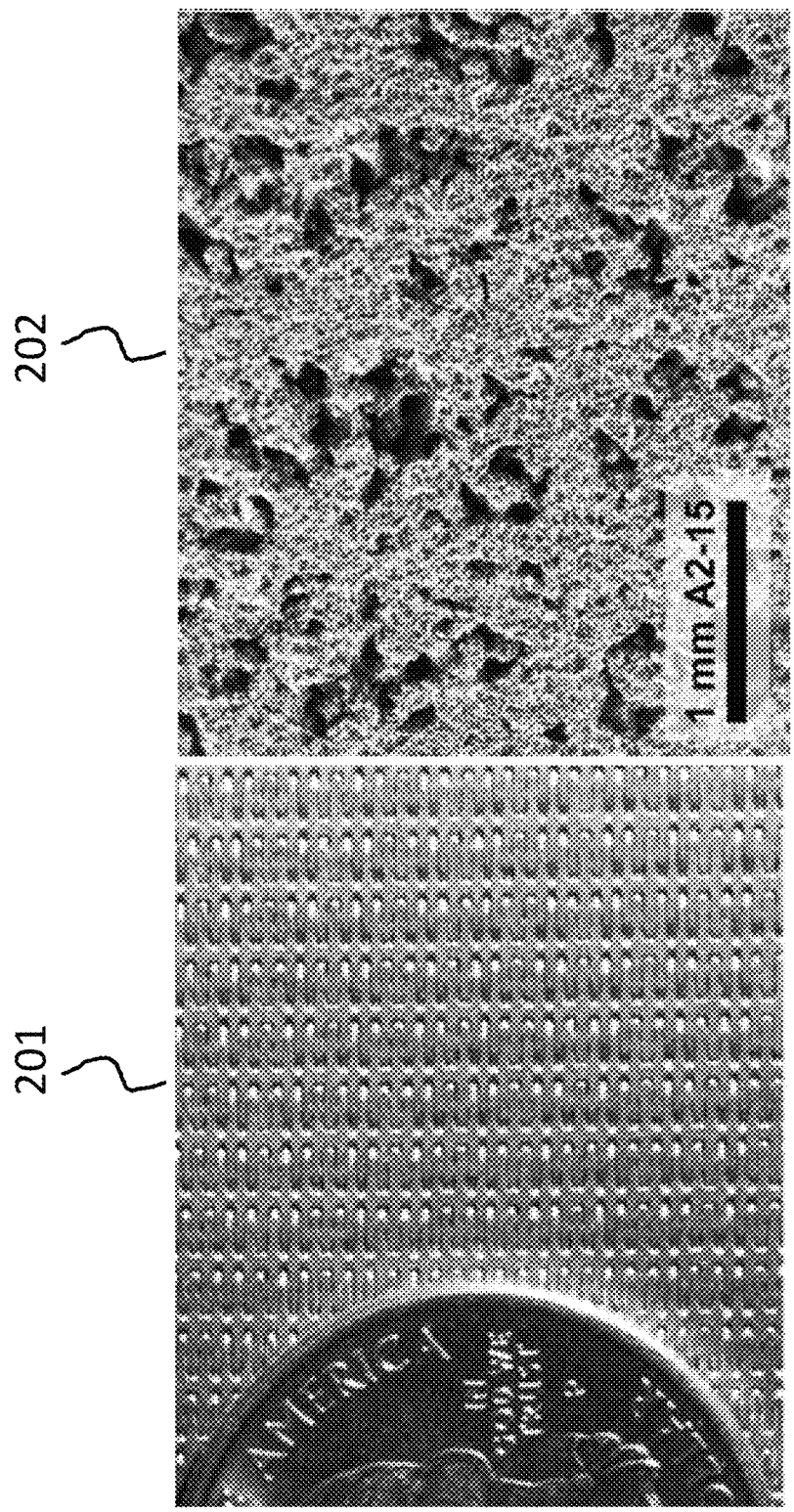
FIG. 6A is a photograph of Rigimesh™ mesh.
FIG. 6B is a photograph of the porous material created by the embodiments herein.

To illustrate the scale of the porosity that Applicants are able to achieve, it should be contrasted with Rigimesh™ mesh by PALL Corporation, which uses a much more expensive mesh technology. FIG. 6B shows the porous material sample 202 having porosity at the scale of 1 mm, in contrast to Rigimesh™ mesh sample 201 shown in FIG. 6A (not Applicants' original image). The U.S. $0.25 cent coin known as a quarter is shown in FIG. 6A and has an approximate diameter of 24.25 mm. Rigimesh™ mesh will be discussed more below.

Applicants' have second scan vector embodiment in FIG. 5C that can be alternative or in addition to the embodiment in FIG. 5B. Here, Applicants use wide, non-overlapping line spacing distances combined with increased layer thicknesses, as shown in the A Pass and B Pass. Additionally or alternatively, Applicants' can skip a FIG. 5C exposure on layers if XY plane flow is desired in those layers. Applicants' can rotate and offset these exposures to produce patterns (or pseudo-randomness) to control flow/tortuosity (as discussed below in connection with FIGS. 7C-7G). The FIG. 5C strategy uses a higher degree of melting of individual lines. With this approach the distance between lines is increased so the lines are not partially overlapping. Additionally, the laser power and speed can be controlled so that the line may be anywhere from fully dense to partially dense. Additionally or alternatively, subsequent layers rotate and potentially offset the lines in a controlled way to produce a patterned structure that will produce the desired permeability and tortuosity. The rotation of the layers can be used to produce a repeating grid pattern (e.g., a 90-degree angle) or a helical pattern like a spiral staircase with these effects producing a repeating lattice like structure. Additionally or alternatively, the subsequent layers can occur every layer, occur on only part of a layer, skip a periodic number of layers, or skip a random number of layers so as to introduce XY plane separation between these features.

In addition, the scanning strategies in both FIGS. 5B and 5C can be combined since FIG. 5B's strategy is suitable primarily for producing random interconnected pores in between particles and tends to result in low mechanical strength when porosity is high. The FIG. 5C strategy can improve mechanical strength and better control flow and can readily be combined with the FIG. 5B strategy by use of a second independent exposure. This combination can yield a sintered material base with higher density lattice like patterns that increase the mechanical strength and importantly can control the flow directions and pathways through the material. FIGS. 5B and 5C can be used together with the FIG. 5A strategy to produce fully dense material in areas where this is desired.

FIGS. 7A-7C show a hypothetical build up of layers in the FIG. 5C scan strategy mentioned above. FIG. 7A shows a first scan of parallel lines 215A on a first layer. FIG. 7B shows a second scan of parallel lines 215B on a second layer above the parallel lines 215A of the first layer. FIG. 7C shows a third scan of parallel lines 215C on a third layer above parallel lines 215A and parallel lines 215B. The angle of lines rotates at an angle compared with the angle of the prior layer. The interconnected voids of unsintered and partially sintered material in each layer and across the layers can create poor channels in the Z-direction in the layers as they are built up (as compared with the XY direction previously mentioned). In some applications, it may be desired to have unsintered or loosely sintered powder present within the material.

Figure 7G:
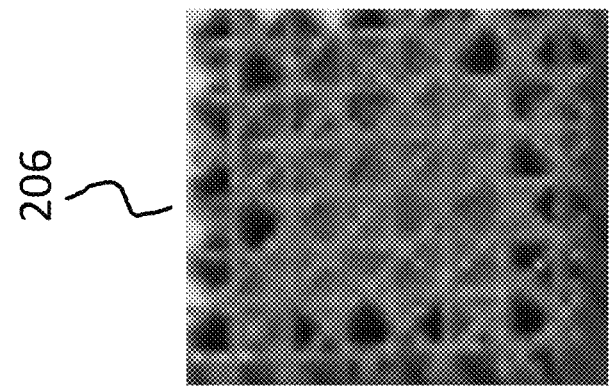
FIGS. 7D-7G are photographs of exemplary materials created by different scan vector configurations.
Figure 7F:
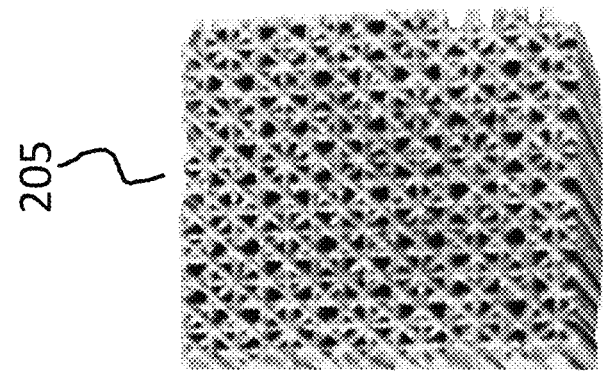
Figure 7E:
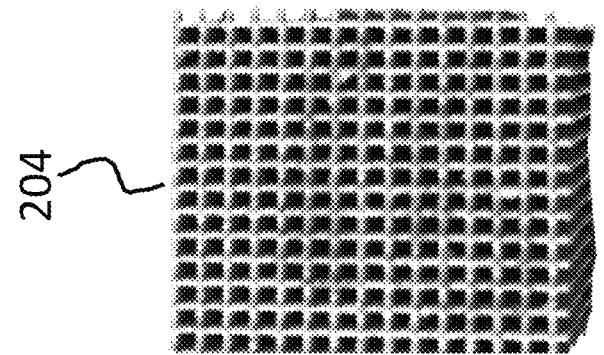
Figure 7D:
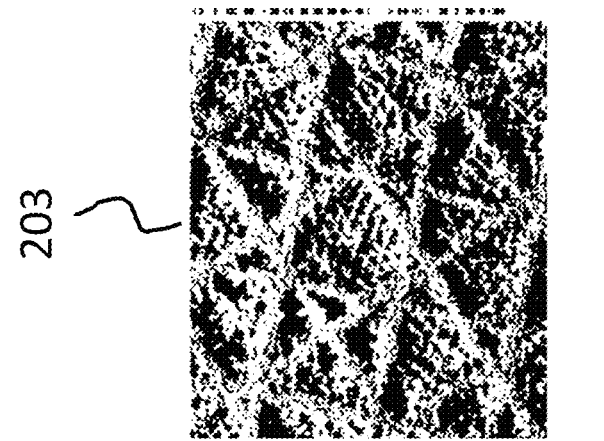

FIG. 7D shows a close-up photograph of a cross section of printed sample material 203. Here, the dense parallel lines from multiple scans occurring in the z-direction at different angles are visible from the FIG. 5C scan strategy. In between these dense lines is material that has become bound together by the FIG. 5B scan strategy. FIG. 7E shows a sample 204 where the angle between layers was 90 degrees, creating a perfect grid. FIG. 7F shows a sample 205 where angle(s) less than 90 degrees between scans across the layers was used. Similar to sample 205, FIG. 7G shows a sample 206 where angle(s) less than 90 degrees was used. Applicants plugged the vertical channels to control the number of open channels. This plugging can be in a pattern or at random on specific layer(s) or across the layers. In contrast with FIG. 7D, FIGS. 7E-7G show lattice like structures that are open except specific plugged areas in FIG. 7G. It is noted that these samples, similar to 7D, could have sections formed by the FIG. 5B strategy within the lattice like structure. The term "acute" in reference to an angle means an angle less than 90 degrees.

To provide further detail of the parameters in hypothetical examples, the FIG. 5A scan strategy might use laser power 350 W, scan speed 980 mm/s, and line (hatch) distance 0.18 mm. In another example, the FIG. 5B scan strategy might use laser power 150 W, scan speed 4000 mm/s, and line distance 0.02 mm. In a different example, the FIG. 5C scan strategy might use laser power 300 W, scan speed 1000 mm/s, line distance 0.6 mm, skip 2 layers after each exposed layer, and rotate line direction by 90 degrees. In another example, the FIG. 5C scan strategy might use laser power 300 W, scan speed 1000 mm/s, line distance 1 mm, and rotate line direction by 10 degrees each layer. Further examples include, laser powers of 200 W with scan speeds of 5000 mm/s, and line spacing of 0.20 mm with a 5 degree rotation per layer.

Applicants can use these combinations of scan strategies, laser parameters and powder properties to control the porosity and structure of AM produced materials and components.

Figure 3:
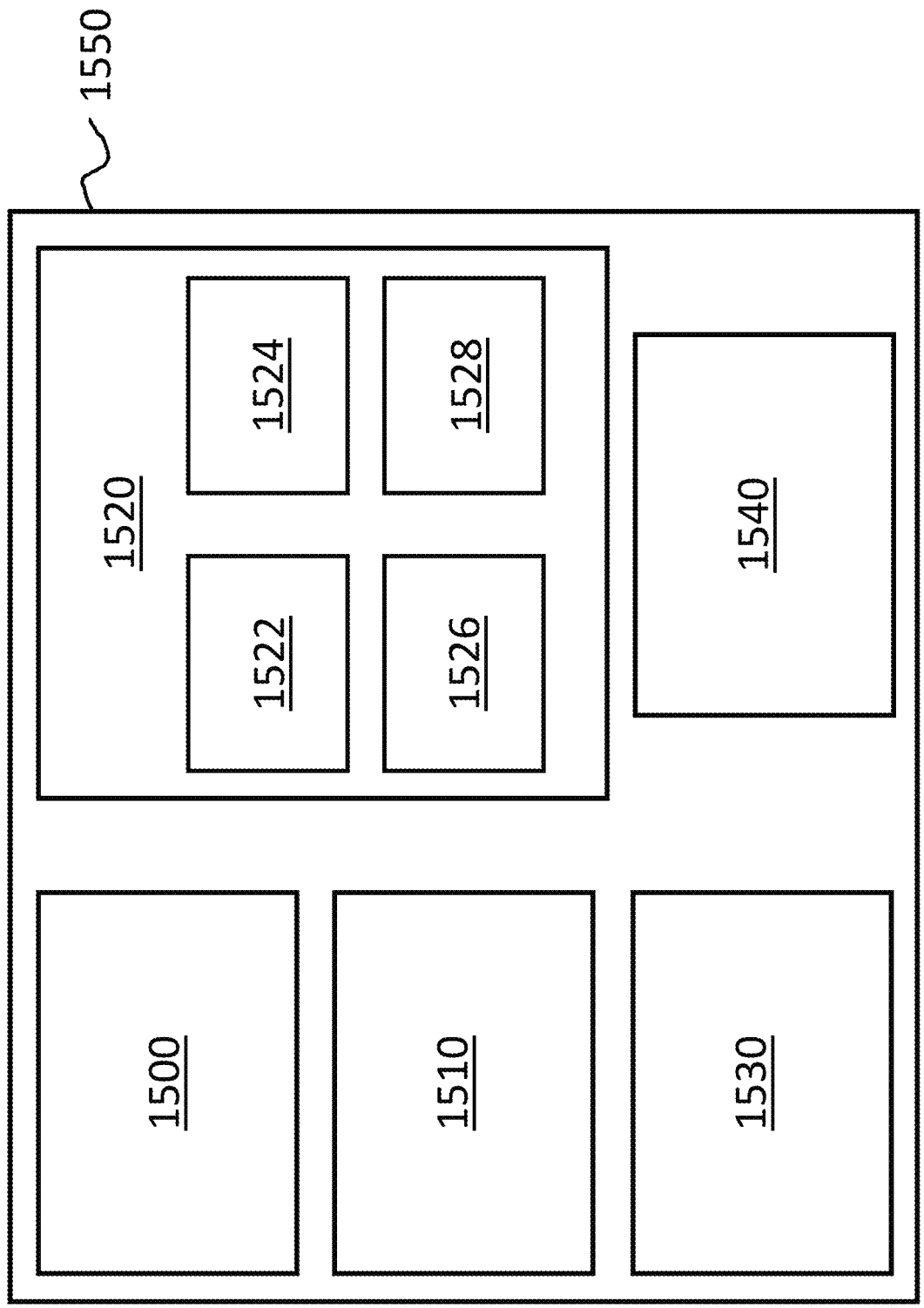
FIG. 3 is a block diagram of an exemplary embodiment of an apparatus or system used to additively manufacture parts.

These can be carried out as a method of manufacturing. Additionally and alternatively, these can be carried about by a modified AM setup that an AM machine seller might provide to its users. Additionally and alternatively, these can be carried about by a computer program product separate from the AM machine that can be installed by the user to make the enhancements to off-the-shelf and other AM machines accessible. This may be able to be downloaded or installed as a firmware update. An example of a modified AM system is one that contains instructions for carrying out the methods described herein, as shown in the block diagram in FIG. 3. AM system includes a processor 1500, storage 1510, an AM apparatus 1520, AM RAM 1522, AM processor 1524, AM storage 1526, AM energy source and scanning system 1528, print settings storage 1530, and CAD File Storage 1540. Print settings storage 1530 and CAD File Storage 1540 can additionally or alternatively be included in AM apparatus 1520. One or more universal serial bus (not shown), peripheral interfaces (not shown), and connectors (not shown) or the equivalent can provide communication between the components shown. Although this is shown as a large system with the AM machine inside, this can be separated out into different combinations and configurations such as an AM apparatus and a computer having all of the separate components, and Applicants may claim all or only subcomponents of what are shown in the block diagram, however configured. Additionally or alternatively, in a reconfiguration, functional components that fulfill the same purpose may be able to replace secondary components that fulfill the same purpose. Any of the components shown in FIG. 1 or available in an off-the-shelf AM system can also be included here even if not shown in FIG. 3 or discussed.

Now that the material and AM process, system, hardware and software, have been discussed, it is time to focus on an exemplary application of the AM methods discussed herein to build components. The AM porous material may be used in a rocket engine injector as shown in FIGS. 8A through 9F. FIG. 8A shows a coaxial injector 301 than can be additively manufactured according to the methods within as a single piece. This kind of injector can be used in a rocket engine where one fluid can enter one port and another fluid can enter another port. Here, a fuel (methane)/(Liquid Oxygen) system will be discussed and these inputs flow through inlets 303, 304. It could also be considered to be a hot side on the combustion chamber side and a cold side opposite the hot side. The fluid enters the swirl area 307 to cause better dispersion when entering into the combustion chamber. Injector face disk 305 is a porous disk which allows fluid to flow across it.

The areas which allow fluid flow may be connected through a fully penetrated mechanical bond 310 to the fully dense areas 308 that do not allow fluid flow in a single component manufactured as part of a single AM build. For this application, Applicants prefer direct metal laser sintering techniques. The fully dense areas act as a support structure around the porous injector face 305, enabling the injector to handle the required pressure loads while providing fluid film cooling for the injector face 305 and/or the combustion chamber 508.

Figure 8D:
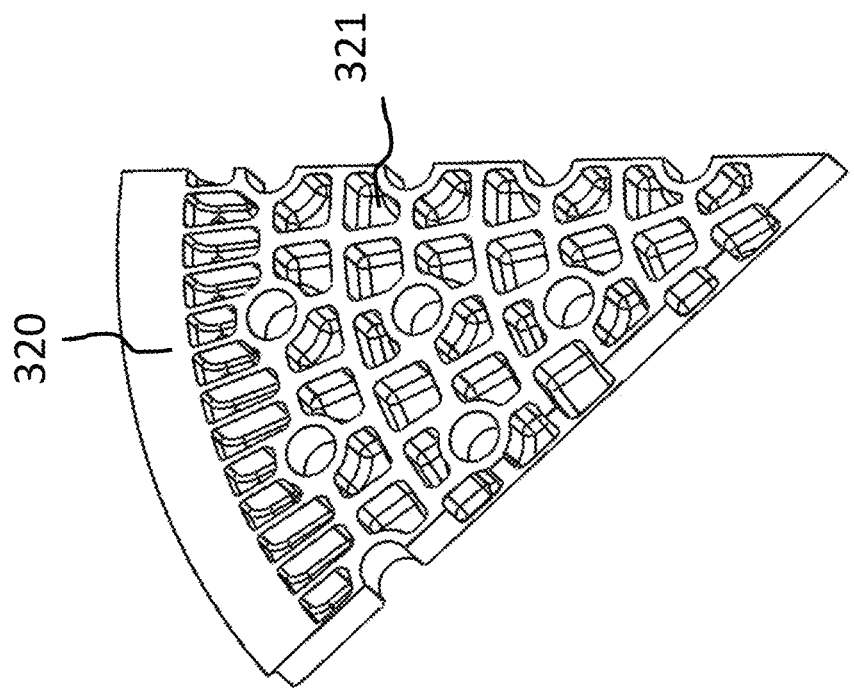
FIG. 8D is a perspective view of a slice of an injector disk for a medium thrust engine with fully dense stiffening members in situ as raised elements with porous material in the recessed pockets 321 and holes for the coaxial injector elements.
Figure 8C:
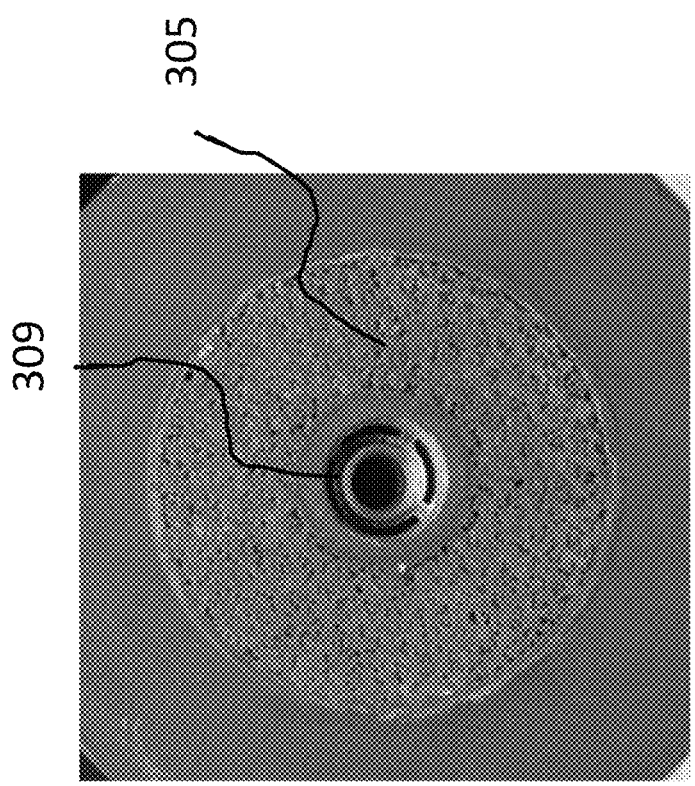
FIG. 8C is a photograph of the injector disk shown in FIG. 8B showing the porous surface area in situ with fully dense material.

FIG. 8C is a photograph of the combustion chamber side of the injector showing the porous disk 305 and the nozzle 309 where the nozzle comprises a fuel annulus and an oxidizer annulus 309 and some percentage of the fluid flow passes through the porous face 305. Alternatively, the central annulus may only flow one fluid with the entirety of the other fluid flowing through the porous disk 305. Injector disk and face can be used interchangeably in this specification and the claims.

Applicants injector offers benefits over the Rigimesh™ mesh system, as will be described below. The existing state of the art for the past six decades for the porous disk in this type of injector has been the Rigimesh™ mesh. This mesh has a consistent porosity across the mesh. The mesh is separate from the exterior and needs manual attachment via brazing or welding. The process to make a Rigimesh™ meshed-based injector disk is time consuming and expensive, costing 6× to 20× more in US dollars and taking 4× to 10× in process time. Additionally it requires extra steps, such as machining, finishing, non destructive testing, and quality review. Each additional process adds risk of scrap and possible failure modes.

FIG. 8B shows a coaxial injector 302 that is identical to coaxial injector 301 except that its injector disk 315 has fully dense structural supports 316 radially outward from the nozzle to the fully dense exterior that can be printed alongside and/or embedded inside the porous areas of the disk. A circle is shown on each of FIGS. 8A and 8B to make it easier for the reader to focus on the different injector disk. It is noted that the claimed features can be applied in non-coaxial injectors also, such as pintle, swirl, or impinging jet injectors. For example, the structural supports can provide functionality to reduce strain on the porous material and increase its fatigue life.

Figure 8E:
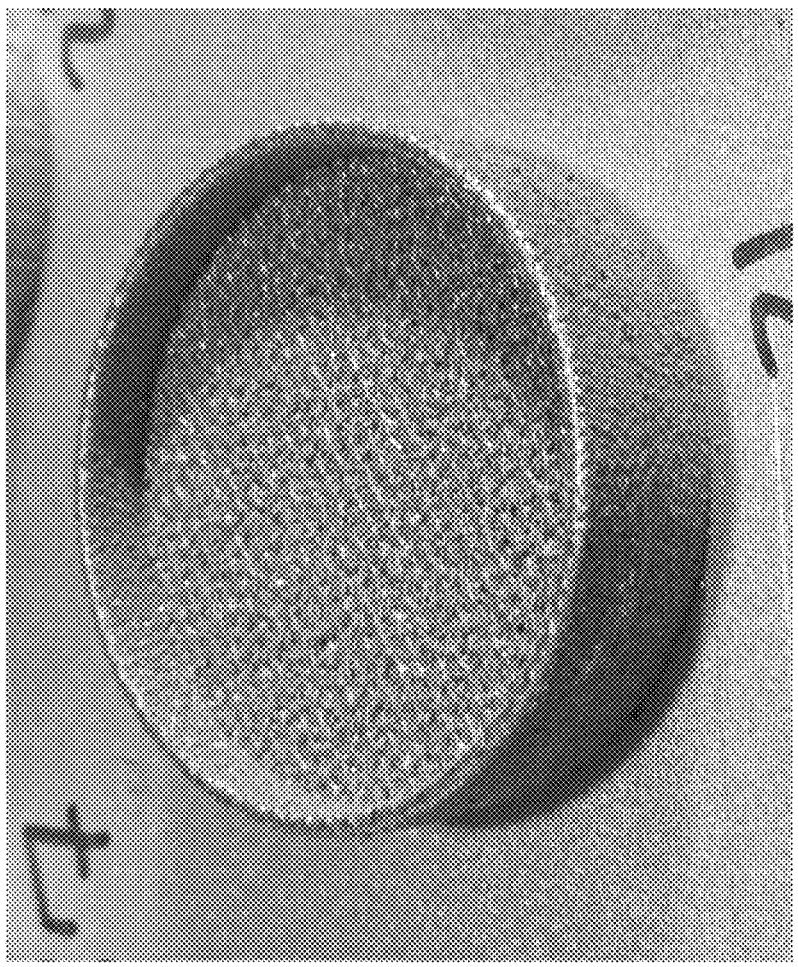
FIG. 8E is photograph of an injector disk and outer wall.
Figure 9B:
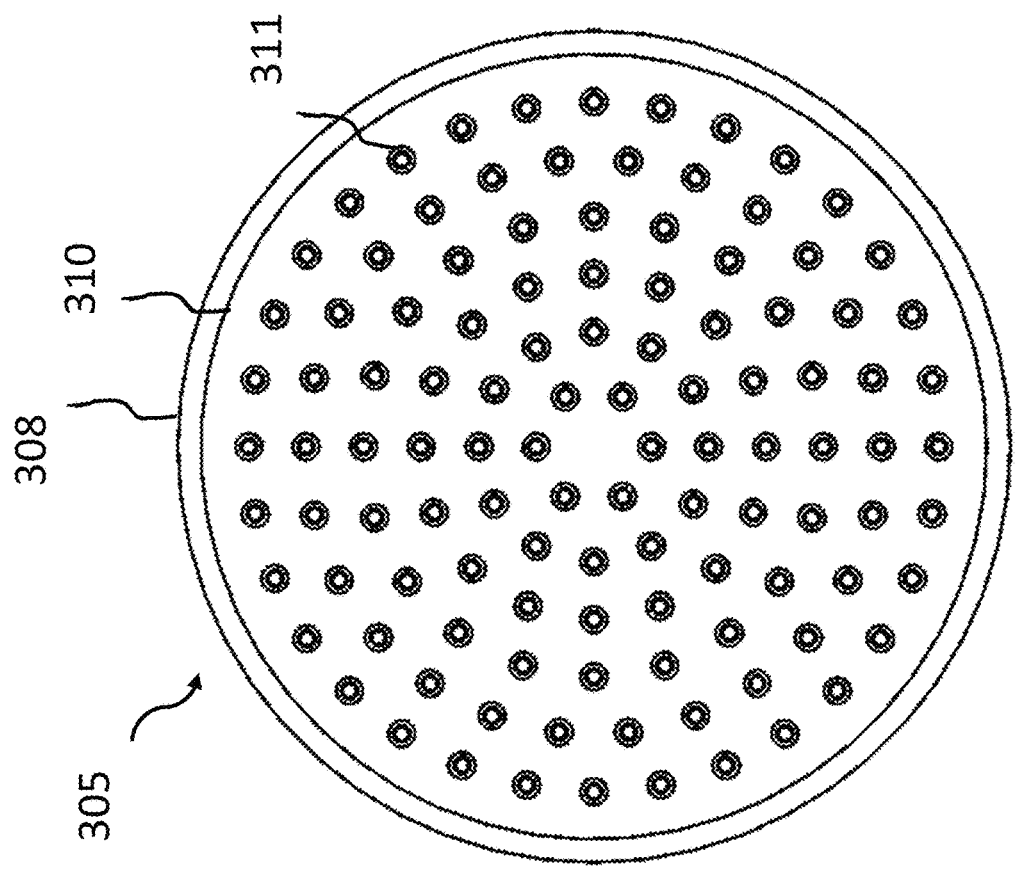
Figure 9A:
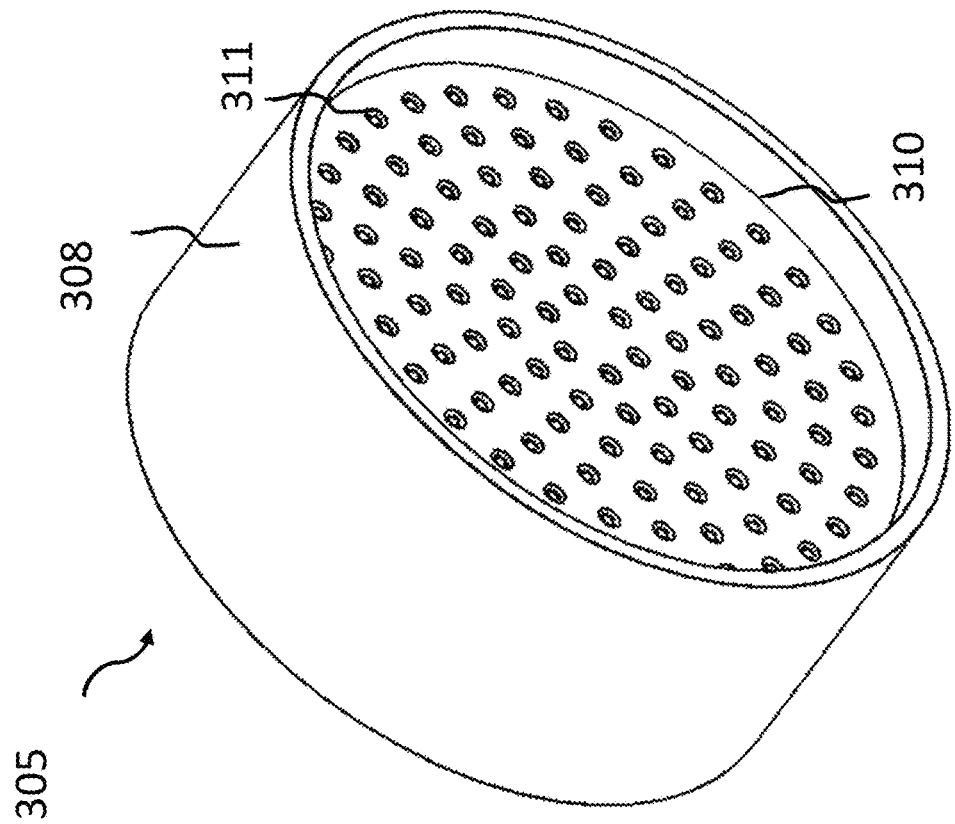
Figure 9C:
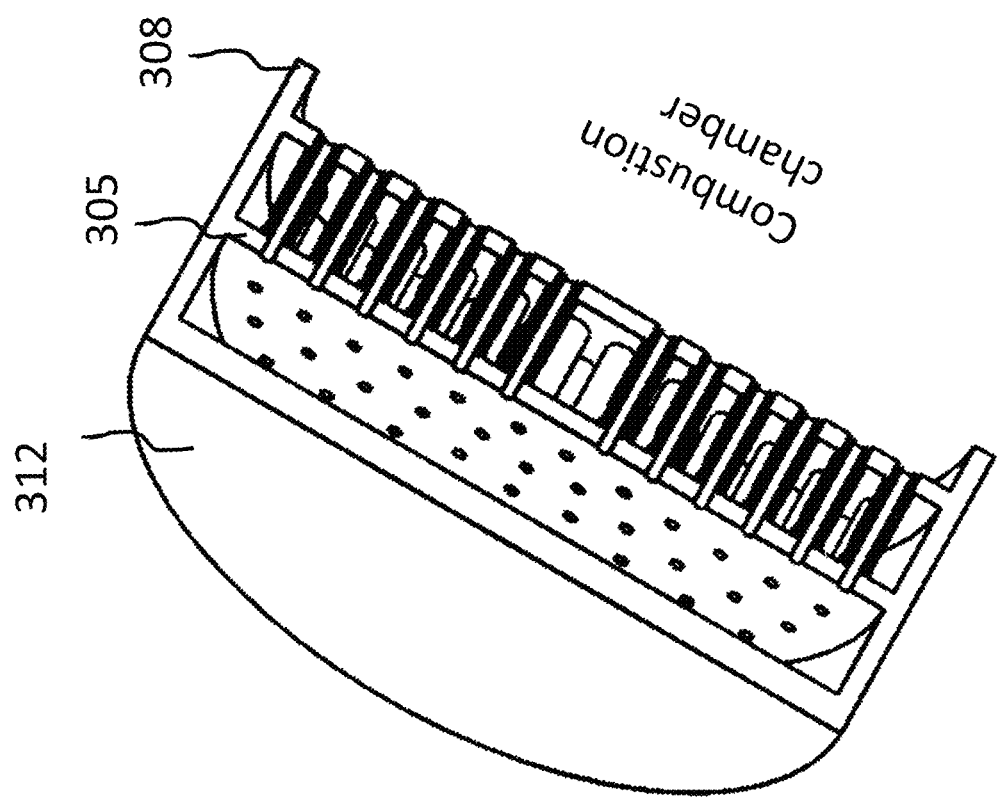

A first object is that Applicant can additively manufacture non-uniform porous material in-situ with fully dense material for the in situ additive manufacturing of both porous and fully dense material in the same part so that no secondary process is required. Applicants injector disk is manufactured together with the fully dense exterior as a single piece, and doesn't require the extra processing that the Rigimesh™ mesh requires to join the mesh disk with the exterior. Applicants' disk can also have dense or fully dense stiffening bars or other features for added strength, as shown in FIGS. 8B and 8D. FIG. 8D shows porous disk 320 having valley areas 321. At the top of the valley areas 320 are stiffening members (shown as unshaded areas) of fully dense material. The porous areas 321 provide fluid flow to transpiration cool the hot injector face. FIG. 8E shows the injector disk with a lattice-like structure of dense wires made by the FIG. 5C scan strategy embedding with sintered material from the FIG. 5B scan strategy. FIGS. 9A and 9B show an exemplary single part AM rocket engine porous injector unit with porous face 305 with controllable resistivity and pressure drop, fluid or gas channels 311, fully dense exterior 308 and a full penetration mechanically bonded interface 310. FIG. 9C is a section lower perspective view of the cross section showing a rocket engine coaxial injector head, with fuel manifold 313 and oxidizer manifold 312. The porous material allowing fluid flow into the combustion chamber from the fuel manifold 313 is the injector face 305 with fully dense material as the outer casing 308 and between the manifolds 320. The porosity is controllable to regulate the fluid pressure drop and face cooling. The component is made of a single additively manufactured part with a full penetration mechanically bonded interface 310. FIG. 9D shows the features of FIGS. 9A and 9B, and in addition the manifold 313, and the boundary 320 between the fuel manifold 313 and oxidizer manifold 312 which is not porous. The boundary 321 between the fuel manifold 313 and the combustion chamber is porous.

Another object is to provide a rocket engine with higher throttling capabilities. This can be achieved through having a gradient of porosity on the porous disk 305 configured to cause a pressure drop. The benefit of the pressure drop is to prevent combustion effects from propagating upstream into the fluid systems. The larger pressure drops enable higher throttling capabilities. Additionally, the pressure drop over the porous region is tuned to allow only a certain desired percent of fluid through the PermiAM, 5% would be typical, while the other 95% passes through the coaxial injector elements.

Another object is to provide an additively manufactured non-uniform porous material in-situ with fully dense material that enables fluid or gas to pass through at a rate determined by the pore size and density.

Figure 12:
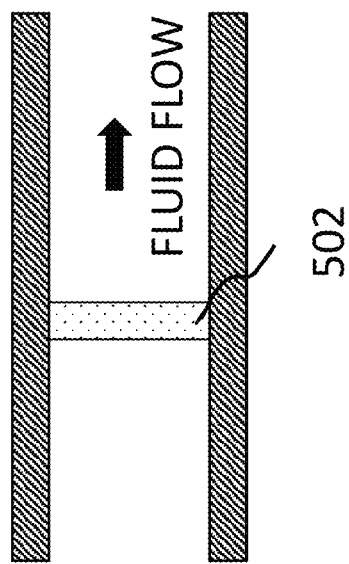
FIG. 12 is a diagram that illustrates another embodiment of the porous material used for filtration.

The porous material may allow fluid flow in an open porosity system or not allow fluid flow in a closed porosity system. Fluid flow through open porosity, which could be a tortuous path, may provide filtration for the fluid by preventing the passage of contaminates larger than the pore size. In FIG. 12, porous material 502 when installed in a fluid transfer line may act as a filter to remove particulates larger than the pore size from the flow stream.

Another object is to provide an additively manufactured non-uniform porous material in-situ with fully dense material that enables areas of porous material to be adjacent to or integrated in areas of full density non-porous material.

The function of changing the build settings on a layer is to deposit multiple material zones which can be integrated with each other. The control of the integration at the interface of the zones may be controlled through the use of overlapping material zones or control of melt pool size around the zone boundaries. Each material zone may have different porosity leading to different material properties or fluid flow characteristics. An embodiment of this method is demonstrated in rocket engine injector face components, where areas that benefit from film cooling may be manufactured in situ next to areas that require different material properties.

The AM porous material may be manufactured in situ with fully dense material. This is a novel benefit because traditional powder bed fusion AM is limited to one set of material properties per build. With the method described herein, the material properties of sections of the material can be tailored by the user while having dense material and/or fully dense material in and or around the porous material with a full penetration mechanically bonded interface 310 at the junctions of the porous and denser areas and/or the fully dense areas. The interface is a benefit because it ensures a complete bonding at the transition between porous to fully dense materials ensuring high strength and cohesion, and lessens the likelihood of failure from stress during component operation. In engineering this is typically captured as a knock down factor for stress based on the interface bond, and a full penetration interface 310 can have no knock down factor. The interface line, as an AM component, is not constrained by traditional manufacturing geometry and may be of optimized non-linear geometry for part function. This method allows the manufacture of previously unmanufacturable geometries and features by allowing porous material to be imbedded inside fully dense material allowing fluid or gas channels 311 with controllable resistivity and filtration capabilities. With all of these as a single part time and manufacturing cost savings can be achieved.

Figure 16A:
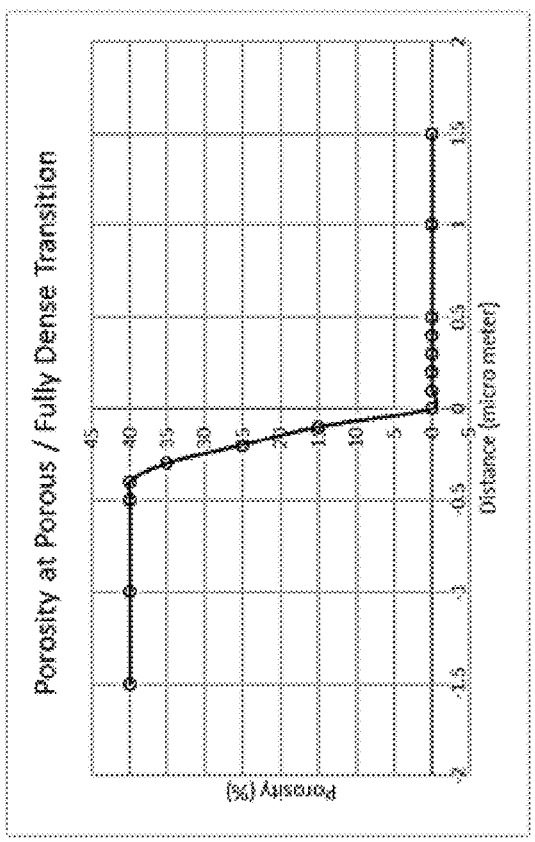
FIGS. 16A and 16B are diagrams of hypothetical data showing how porosity varies across distance of Applicants' full penetration mechanically bonded interface.
Figure 16B:
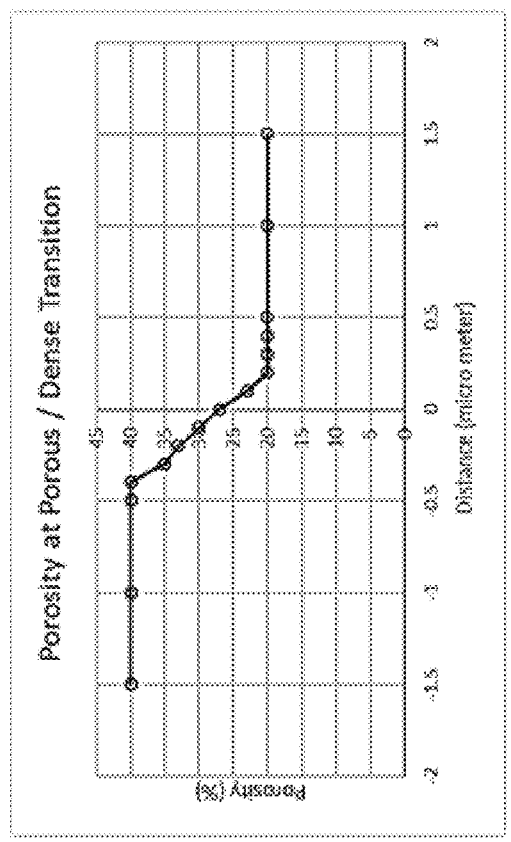
Figure 16C:
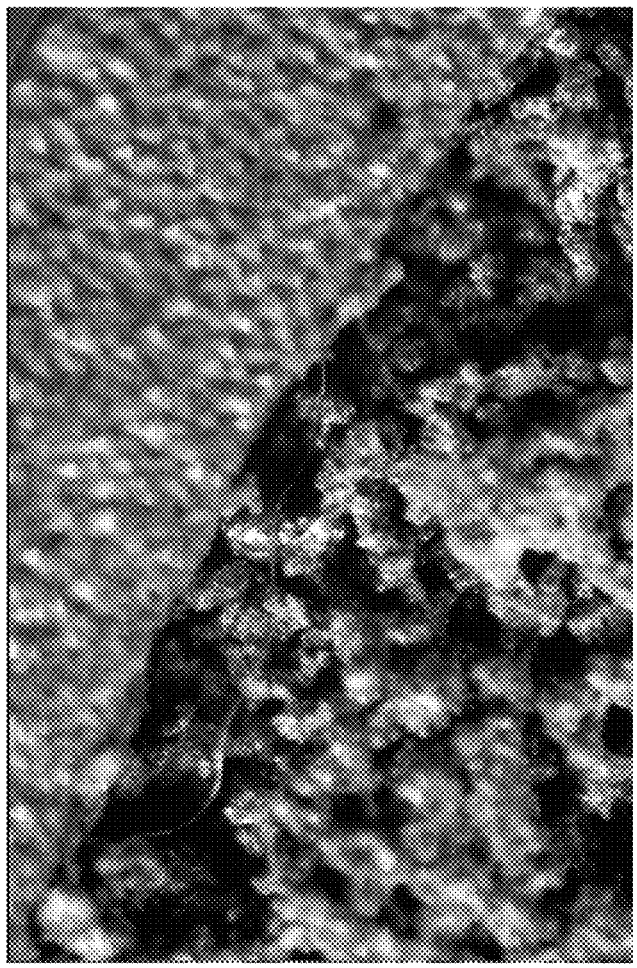
FIG. 16C is a photograph of a cross section showing Applicants' full penetration mechanically bonded interface.

Applicants include FIGS. 16A and 16B (hypothetical data) to show Applicants' understanding of the microstructure at the full penetration mechanically bonded interface at a porous/fully dense interface and a porous/dense interface. At the porous (40% porosity)/fully dense (0% porosity)

interface, the porosity does not decrease or increase on the side of the interface that is already fully dense but does decrease on the porous side as the interface is approached. In contrast, at the porous (40% porosity)/dense (20% porosity) interface, Applicants expect the interface to be an average of the porosity on both sides with both sides changing porosity as the interface is approached. FIG. 16C is an actual photograph of an interface showing a fully dense side next to a side having 10-15% open porosity.

To achieve the AM porous material in situ with fully dense material in a single part, Applicants prefer to use an AM machine which allows the ability to upload multiple component part files. The stl or other compatible file is then broken down into multiple sections based on the desired material properties. The build files for each stl part section are set with the desired parameters to achieve the target density. As the stl part sections are from the same component, and on the same dimensional space, the interface distance between them is 0, allowing the full penetration mechanically bonded interface, e.g., interface 310, as the laser treats it as a normal sintering pass and bonds the sections. Misprocessing of this area can cause cracking upon cooling or upon part usage. Even though the interface distance between the sections is 0, depending on the heat soak from the energy source into the surrounding areas or other process parameters introduced, there may be some overlap of energy absorbed beyond the interface from the opposite build settings that potentially results in a transition area. An alternative method is to have overlap between the section stl files such that the lasers make passes over the interface multiple times per the build parameters of the section files. The corresponding density of the overlap region is determined by the VEI.

Another object is to provide an additively manufactured non-uniform porous material in-situ with fully dense material that enables gradations of porosity based on material density and additive manufacturing build settings. The porous material is controllable for pore size and density which determines component properties. The porosity does not have to be uniform and can vary through layers or gradations, as can be seen in FIGS. 10C and 10D. Between each significant gradation is preferably a mechanically bonded interface the same porosity as the higher density portion of the interface or alternatively a full penetration mechanically bonded interface.

Another object is to provide an additively manufactured non-uniform porous material in-situ with fully dense material that allows film cooling of a combustion chamber wall. The porous material allowing film cooling of the chamber wall is integrated into the injector face with fully dense material 308 as the outer casing. Additionally, film cooling features can be created to control the thermal environment inside a combustion chamber. The film cooling is traditionally injected along the outer edge of the injector face of a rocket engine injector, between coaxial injector elements and the wall where re-circulation effects can cause high thermal loads on the engine. The addition of the fuel film cooling provides both a heat reduction through evaporation of the liquid but also changes the local mixture ratio to a more fuel rich combustion and thereby lowers the local temperature at the cost of engine efficiency.

Figure 13:
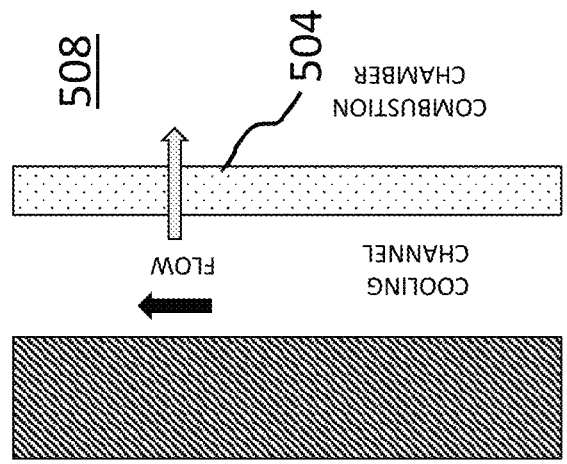
FIG. 13 is a cross section of a rocket engine combustion chamber wall according to another embodiment.

In a different embodiment, FIG. 13 is a cross section view of a typical cooling channel along the hot wall of a regenerative cooled rocket combustion chamber. The chamber wall may be constructed out of a strong and porous material to allow transpiration or film cooling of the hot wall 504. The film cooling is used to cool the hot wall 504 of the combustion chamber 508 by the injection of fuel down along the wall to create a boundary layer buffer. The transpiration cooling is where a smaller quantity of fluid is injected, as compared to the film cooling, such that the fluid vaporizes off the wall instead of flowing down along the wall. The porous material can be placed in the hot wall 504 at any location in the chamber to add transpiration or film cooling precisely where it is needed, even at the through which undergoes the highest thermal stress. Film cooling in rocket engines typically varies between 0% and 20% of total fuel flow, and the porosity control enables fuel to be added where needed at these volumes. For example, the regenerative cooling channel can allow a transpiration cooling flow of around 0.1% to 5% fluid flow through it along the length of the cooling channel, enabling controlled cooling while ensuring enough propellant makes it to the injectors. Another example would be a higher 30% porosity area along the cooling channel to introduce a film cooling flow along the chamber wall of 10% fluid mass flow upstream of the throat, which is typically the hottest section of chamber wall. These capabilities ensure the base material of the chamber wall do not overheat and melt.

Figures 14A, 14B:
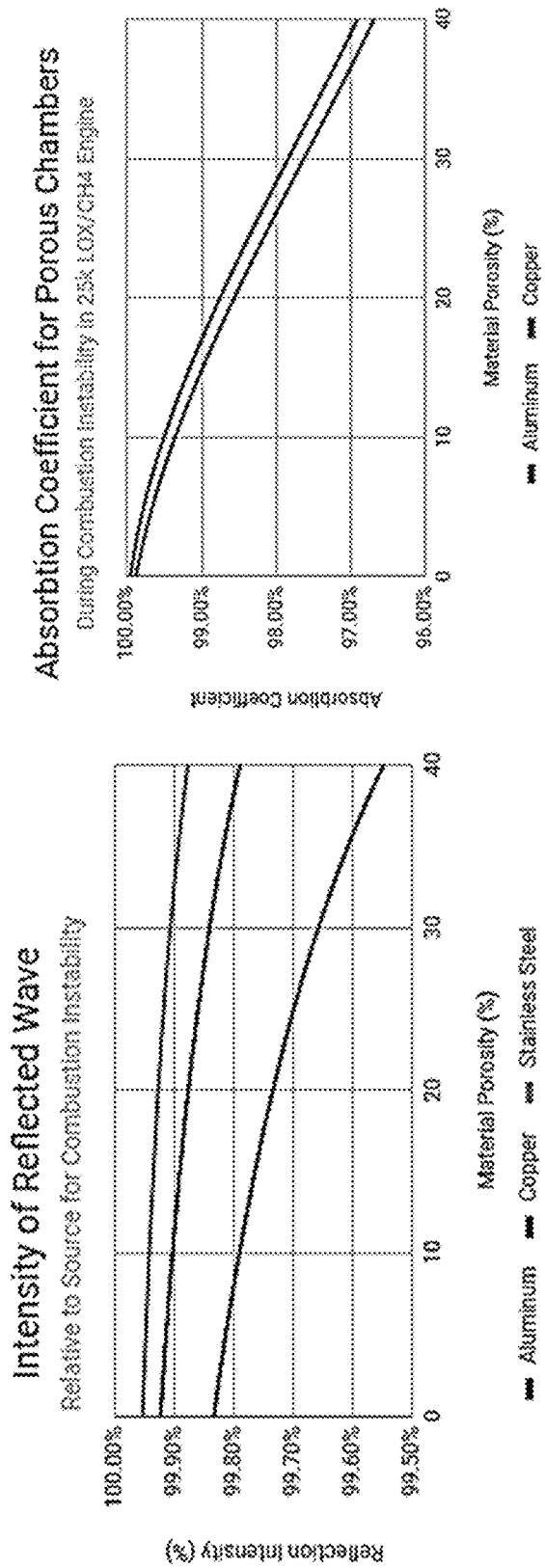
FIGS. 14A and 14B are diagrams of experimental data showing how absorption and reflectivity change with porosity.

Another object is to provide an additively manufactured non-uniform porous material in-situ with fully dense material that reduces the magnitude of reflection for pressure waves. The effectiveness of the AM porous material for acoustic damping can be determined by looking at the intensity of the reflected waves relative to the acoustic source. As shown in FIG. 14A, different materials have different reflection properties due to the base material structure, which can also be influenced by porosity. The work performed here ties the reflectivity to porosity which can be controlled through VEI of the AM porous material process. This allows for the desired tuning. Another effect on combustion instability is through the absorption coefficient of the chamber as seen in FIG. 14B, which is also tied to porosity through this work. The data here uses industry standard dimensions for rocket engine design to determine the expected absorption for several materials.

The structure of this element is to preferentially place porous material in a combustion chamber to reduce, preferably eliminate, the effects of combustion instability. The geometry of the porous material may be preferentially tuned to damp acoustic waves or adjust the frequency to avoid resonance. In one embodiment regions of varying porous density may be used to preferentially effect particular wavelengths. In one embodiment a lower porosity layer may be external facing to a combustion chamber with an internal layer of higher porosity to produce the effect of a Helmholtz resonator. This means that lower porosity or smaller pores are present in the combustion chamber facing layer and the internal layer has larger and or higher pore density to act collectively as a Helmholtz resonator. The absorption coefficient of a combustion chamber wall may be tuned based on design need and material porosity, as shown in FIG. 14B for exposed porosity. When layered with lower porosity outer layer and a higher porosity inner layer, the wall can create a Helmholtz regulator effect.

Tunable pressure wave response uses AM porous material to control the response the material to pressure waves. Applicants use this to control combustion instabilities in a rocket engine. The porosity may be varied to achieve acoustic damping of the desired amount, typically to reduce resonance from occurring. When resonance in the system occurs, it can lead to combustion instability in rocket engines leading to destruction of the engine and possibly the launch vehicle. The method of action in combustion instability is violent and fast, with destructive levels of energy able to build in milliseconds. Based on the typically steep fall off of the resonance curve when the response wave is damped to a lower frequency, an acoustic damping effect of less than 0.1% has been demonstrated experimentally as having a positive effect on combustion stability performance in rocket engines. The method of manufacture for AM porous material shown here has the capability of geometry and performance not capable with traditional manufacturing methods, which may allow the elimination of combustion instability through careful engineering and design in future rocket engines. Estimates of combustion instability frequencies can be developed during the rocket engine design phase using resources such as NASA SP-194. Once the frequencies of concern are found, the proper placement and porosity of AM material may be determined to ensure a reliable and stable rocket engine. As combustion instabilities are the main cost driver for rocket engine development, the ability to pre-emptively solve the problem with the application of AM Porous Material will save millions of dollars and years of development time. For reference large engine programs can cost up to $7 billion and 6 or more years to design, test, and certify.

Figure 9E:
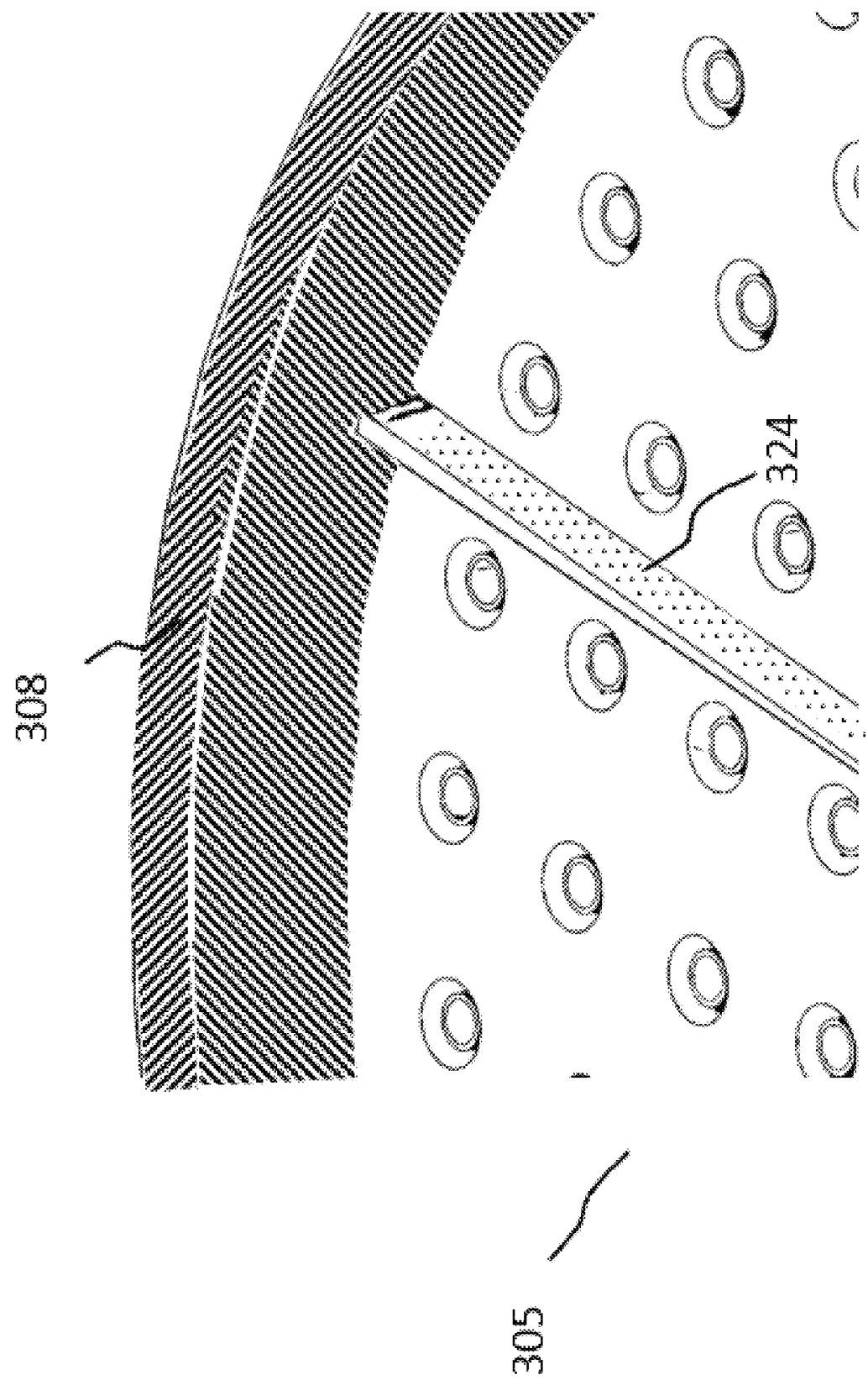

Another object is to provide an additively manufactured non-uniform porous material in-situ with fully dense material that alters the frequency and or amplitude of pressure waves that interface with it. FIG. 9E shows an alternative embodiment of disk 305 where porous material may be engineered (e.g., specific pore size or pore depth to tune out specific frequencies) into a combustion chamber to dampen the intensity of acoustic waves generated in the system. This may reduce or eliminate combustion instabilities through inhibition of resonance. Porous material can be designed into the structure such that acoustic damping baffles 324 on disk 305 are created which can benefit from the fluid flow to reduce heating while the porous structure dampens acoustics.

The exact porosity of the baffles 324 would be tuned to the needs of the specific engine or environment. In addition, these baffles or similar structures with tunable porosity may be appropriate for other areas of the rocket engineer or combustion chamber. FIG. 9E shows the outer walls 308 as fully dense. Additionally or alternatively, the outer walls of the injector and/or combustion chamber may also be porous to provide acoustic damping for other instability modes. FIG. 9E does not show the porous disk as being porous, but it is understood to be porous. The respective porosities of the acoustic damping baffles 324 and the porous disk 305 may not be the same.

Another object is to provide an additively manufactured non-uniform porous material in-situ with fully dense material that disrupts resonant waves in combustion chambers to eliminate or reduce the severity of combustion instabilities. Layers of lower porosity on the hot wall of a rocket engine may be desired, with higher porosity layers below and with fully dense material as a final structural layer. This results in formation of a Helmholtz resonator effect as the smaller pore size of the external layer influences the frequencies passed into the larger resonating section which damps out the acoustic energy. The benefit of the AM porous material method is that it enables Helmholtz resonators to be placed in areas not normally feasible with traditional manufacturing methods as well as feature sizes which are difficult to achieve in traditional rocket engine manufacturing. The effect of the resonator is based on the distribution of average pore size over the feature volume, allowing the effective pore density to be established based on the number of pores in the top layer which connect to the pores and cavities in the lower layer.

Features for tunable pressure wave response may be placed in a number of locations in the design, including the combustion chamber wall 504 where they can be used to damp out transverse combustion instabilities. Porous AM material on the injector face may be used to dampen out longitudinal combustion instability modes while radial modes may be damped out by raised porous AM features on the injector face, as shown in the areas between valleys in FIG. 8D and baffle 324 in FIG. 9E. This represents an improvement in the state of the art as there have been features on injector faces to assist in the control of combustion instabilities that are only providing benefit from their disruption of the flow field and not also addressing their acoustic properties. An additional improvement is the capability to imbed the acoustic control features inside the combustion chamber hot wall, and provide coupling with film cooling capabilities to ensure the rougher wall surfaces do not overheat during operation.

Another object is to provide an additively manufactured non-uniform porous material in-situ with fully dense material that is tunable based on laser power and DMLS, SLS, or SLM, or LBPF build settings. Herein, three-dimensional porous articles are created from particles, usually in the form of a powder, that are sintered or partially melted together using a directed energy source such as a laser.

In the preferred embodiment of this method there is no CAD dependent porous geometry to generate; the pore structure is entirely dependent on the source material and AM build properties. The function of this method is to create a porous structure of smaller scale than is traditionally practicable based on the resolution of AM machines from CAD models. One embodiment can produce a porous structure representative of the arrangement source particles without the need to model this arrangement in CAD software. Further, the embodiment enables fabrication of three-dimensional articles with varied amounts of porosity within the same part such as functionally graded porosity or porous sections adjacent to non-porous sections. One method within this embodiment controls the energy input to produce the target porosity level. Another method within this embodiment uses distances between scan lines that leave lines of higher porosity material between lower porosity lines and alters the orientation of the lines for subsequent layers. Another method within this embodiment creates a patterned porosity by using a directed energy source that can be switched on and off, or changed from one power to a second power, or changed from one travel speed to a second travel speed. An alternative embodiment would use material containing ceramic particles which may be removed from the metal matrix through chemical leaching post build, leaving the metallic structure unchanged or would use a component that would volatilize during processing to introduce porosity that is retained upon solidification of the metallic phase.

A benefit of this porous material is to provide a flow path for fluids from one location to another, with the pore size and density acting to regulate the flow of the fluid. A secondary function of this method is to control the stiffness, strength, density, or coefficient of thermal expansion of a material.

Additively Manufactured ("AM") porous articles are built using a directed energy source, such as a laser, to sinter or fuse material. The structure of the material is controlled by the feedstock material characteristics and the laser spot size, scan strategy, and energy input.

Applicants determined how to set the parameters for a given application with a given material. Volumetric Energy Input ("VEI") is a measure of the energy input per volume of material deposited during the manufacturing process. The VEI can be calculated by, $$VEI = \frac{P}{S*D*T},$$

where P is the power of the laser or directed energy source, S is the scan speed, D is the distance between scan lines, and T is the layer thickness. The energy absorbance of the powder must also be considered by multiplying by an absorbance factor A to get the volumetric energy absorbed. The temperature dependent constant pressure heat capacity, $$C_P \equiv \left(\frac{\partial Q}{\partial T}\right)_P,$$

can be empirically represented in the form of $$C_P(T) = a + bT + \frac{c}{T^2} + dT^2,$$

where a, b, c, and d values can readily be tabulated based on experimental data for a material. The molar heat capacity can be converted to a volumetric heat capacity through the mass per mole and the mass per volume of the feedstock powder. Using an energy balance comprised of the volumetric energy absorbed and the volumetric heat capacity with phase change energy, the adiabatic temperature can be calculated. The calculated adiabatic temperature, Tad, and the fraction of material undergoing a phase change, α, are useful for predicting the degree of sintering or melting of the material.

$$E_{absorbed} = \int_{T_0}^{T_{ad}} C_p dT + \alpha H_{phase}$$

where $E_{absorbed}$ is the energy input absorbed from the laser, Cp is the constant pressure heat capacity of the material, and $H_{phase}$ is the phase change enthalpy. For increased accuracy, the temperature and time dependent heat transfer to the surroundings, β, must also be considered. A density factor, $\rho_{factor}$, can be calculated by taking the ratio of energy absorbed and energy where the material is fully melted, $E_{melted}$, from the heat capacity, phase change energy, and heat lost to surroundings at the temperature and energy where the material is fully melted.

$$\rho_{factor} = \frac{E_{absorbed}}{E_{melted}} = \frac{E_{absorbed}}{\int_{T_0}^{T_{mp}} C_p dT + H_{phase} + \beta}$$

The density factor can then be related to part density or part porosity.

For $\rho_{factor} < \rho_{minimum}$, $\rho = \rho_{powder}$

For $\rho_{factor} > \rho_{minimum}$, $\rho = \rho_{powder} + (1 - \rho_{powder})(1 - c_1 e^{-c_2(\rho_{factor} - \rho_{minimum})})$ Where $\rho_{minimum}$ is the minimum $\rho_{factor}$ required to increase the density, above the initial powder density, $\rho_{powder}$, and $c_1$ and $c_2$ are experimentally determined constants.

The required volumetric energy input to achieve a particular porosity depends on the specific material being manufactured. Volumetric energy input can be controlled in several ways, including but not limited to laser scan speed, laser power, laser hatch distance and layer thickness. Feedstock properties that affect the density factor include material absorptivity, heat capacity, phase change enthalpy, heat transfer to surroundings, and internally generated energy through the Reactive Additive Manufacturing process (US Patent Application Publication No. 2016/0271878A1). Additional feedstock characteristics that affect part density include feedstock size, geometry, surface topography, relative density, and impurities including moisture.

In one embodiment Tungsten porosity can be engineered through the use of the following equation: Porosity= $0.6931 * e^{\wedge}(-0.007 * VEI)$. Input either the VEI or the desired porosity to determine the other variable. To lower the VEI and increase porosity, the laser power can be lowered, or the laser travel speed can be increased. Alternatively, the distance between scan lines can be increased to increase porosity or the laser power can be pulsed from higher to a lower power or on and off. These methods allow the user to set the laser parameters in the print control file and thereby control the porosity throughout the part.

This method differs from CAD models that build in open porosity, which require the manual or CAD side generation of the porous structure which is then exported to the AM build machine through a compatible file format, such as an STL file. This method is work intensive for the user and requires extensive pre-processing before build. In addition, the manual methods have a lower limit on the porosity size based on the minimum feature resolution of the AM machine.

Current state of the art AM machines typically have a minimum structural feature size resolution of around 250-500 μm (0.01 inches). Porous materials with void spaces smaller than this have not been manufacturable through current methods. The disclosed method for AM porous material does not share this limitation, as pore size can be controlled through the application of the VEI formula and the material characteristics. This allows pore sizes down to the microscopic level and enables homogeneous pore space throughout the material. As the VEI is controlled in the print setup file, no arduous or complex pre-processing CAD work is required freeing up thousands of hours of engineering design time. In contrast, current state of the art material development work for printable powdered metal AM materials have focused on achieving fully dense results, not the more difficult process of enabling tuned material properties. The AM methods herein will enable new kinds of engineering structures and products. For example, using these methods, rocket engines can now allow for face cooling of the injector face through the metered release of fuel into the combustion chamber around the coaxial injector elements.

The porous material manufactured herein can be precisely tuned to influence the mechanical properties of manufactured materials. The porous material can have porosity size and density controlled to tune strength and stiffness to engineering needs. In addition, the coefficient of thermal expansion ("CTE") is controlled. The void size and distribution of porous material allows a tuning of these physical properties. The novel manufacturing technique disclosed here allows porosity to be controlled allowing highly engineered material properties to improve the design and functionality of many items, including and not limited to rocket engines.

Figure 11B:
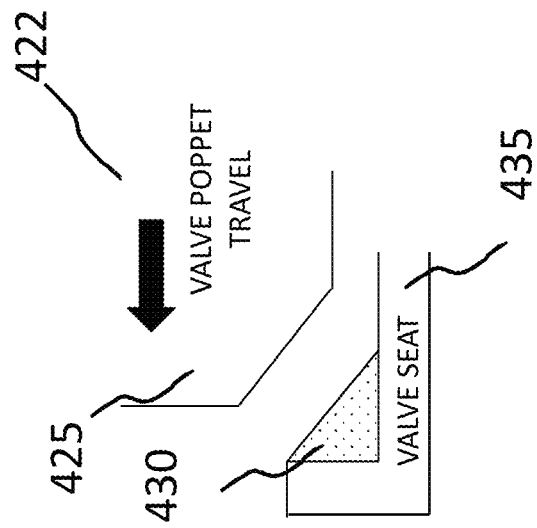
FIG. 11B illustrates another embodiment of a valve seat component that can be manufactured herein.
Figure 11A:
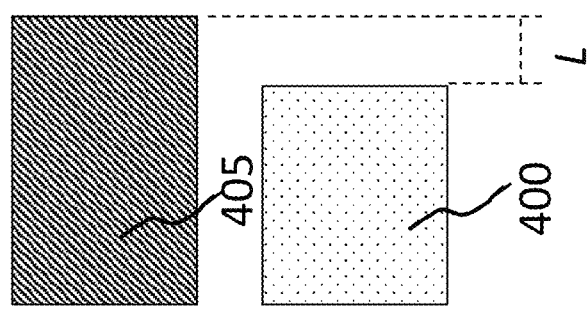
FIG. 11A is a diagram illustrating an ability of the porous material to change the CTE response of manufactured components.

Tunable porosity in additively manufactured parts can address other engineering problems. Valve seal deformation control is an important problem in engineering, particularly for valves which must seal while undergoing large thermal swings, in rocketry thermal cycles of +/−200 Kelvin or more are commonplace. The use of the AM porous material in valve seats allows the control of coefficient of thermal expansion ("CTE") to enable reliable sealing over a broad range of temperatures. FIG. 11A shows the difference in expansion of two hypothetical samples, porous material 400 and fully dense material 405, as a result of a temperature change. FIG. 11B shows that inserting porous material into a valve seat design, as shown, may provide better seal performance over traditional methods by controlling deformation due to stress and thermal effects in a more beneficial manner. FIG. 11B shows a valve 422 used in a rocket engine. As the valve poppet 425 travels to the valve seat 435 to create a seal, porous material 430 is added to help create the valve seal across a wide range of temperatures. In general, the seal and valve body typically have a different thermal mass than the actuation disk or ball, so they deform at different rates during cooling. Through the addition of AM porous material 430 inside the seal with fully dense material exposed to the fluid flow, the sealing will not be compromised and the rate of CTE can be controlled (expanded or contracted) and optimized. Porous material may have its coefficient of thermal expansion or contraction tuned to the component needs based on the pore size and structure. The same techniques used to optimize valve seal CTE control can be used to optimize CTE behavior of entire parts or assemblies through the precise application of porous material. Similarly, porous material with controllable porosity may be integrated into structural members to control deformation due to stress or thermal effects.

One geometric variation involves using layers of varying porosity by taking advantage of the AM Porous Materials ability to be built in situ with other material densities, they need not all be fully dense. The number of layers used or densities chosen is limited only by the design needs of the component, and by the lower limit of allowable porosity in a particular material. The lower limit is when the amount of porosity is too high for a fused and handle-able material to form. Each interface between porosity levels is preferably a full penetration mechanically bonded interface.

The AM porous material may also be located inside, for example, a rocket engine coaxial injector element 326 in FIG. 9F. Porous material may be located inside injector geometry, coaxial injector shown here. The porous material located on the top sections of the coaxial tubes provides damping for organ pipe instabilities. The element is the material at the top of the nested coaxial tube assembly, the example shown is for the fuel element and it may also be applied to the oxidizer element, provides tunable damping for organ pipe modes which may develop in the injector element and lead to engine damage, overheating, combustion instability, and pogo instabilities which can influence the entire vehicle fluid system and turbopump performance. The dampening is tuned by adjusting the porosity of the elements 326, which are shown as the speckled portions of FIG. 9E. Note that the nested tube assembly, even that no speckling or hatching is shown, may consist of porous, dense and/or fully dense portions.

Coupling between instabilities in the injector and combustion chamber are specific to a particular design and the influence of this improvement may be modeled with the NASA ML Pogo software, as this program is ITAR no specific examples are included here. However, to implement the AM methods into a design, the key variable an expert in the field would need to know is the absorption coefficient and intensity of the reflected wave, an example of which is provided here.

FIGS. 10A through 10D show a non-exhaustive list of possible geometric configurations and placement of the AM porous and fully dense material. Exemplary options for integration of Porous AM Material into components is shown in cross section in FIGS. 10A through 10D. FIG. 10A shows example 349 where fully dense material 351 fully surrounds a porous material 350. FIG. 10B shows example 355 where fully dense material 354 and 353 wholly surrounds and sandwich in porous material 352. FIG. 10C shows sample 358 with different porous layers on top of a fully dense layer. FIG. 10D shows gradations in layers from porous to dense. In reality, this can be even finer gradation across the sample 360. Applicants will note that the gradations between materials with different porosity density are prone to cracking. To prevent cracking, Applicants overlap build areas so the laser will hit part of the sample multiple times to back melt the interface and lessen the gradation at the point of the interface, make density more gradual, printing permeable area before printing solid area, printing a combination of FIG. 5A-5C strategies together so material's load goes onto more dense or fully dense wires or lattice, and skipping layers.

The influence of the porous material for tunable pressure wave response are shown in FIGS. 14A and 14B to assist the designer in applying this method to rocket engine designs.

Figure 15C:
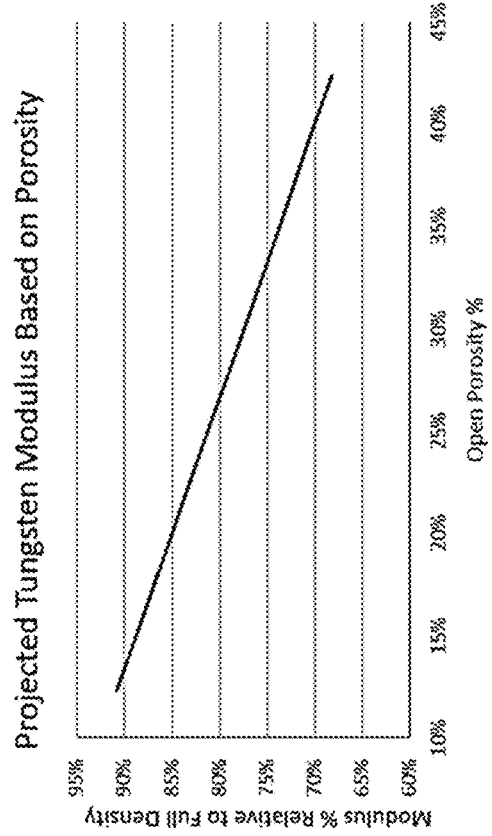
FIGS. 15A-15C are diagrams of experimental data showing how porosity, laser power input, density and Young's modulus vary relative to each other.
Figure 15A:
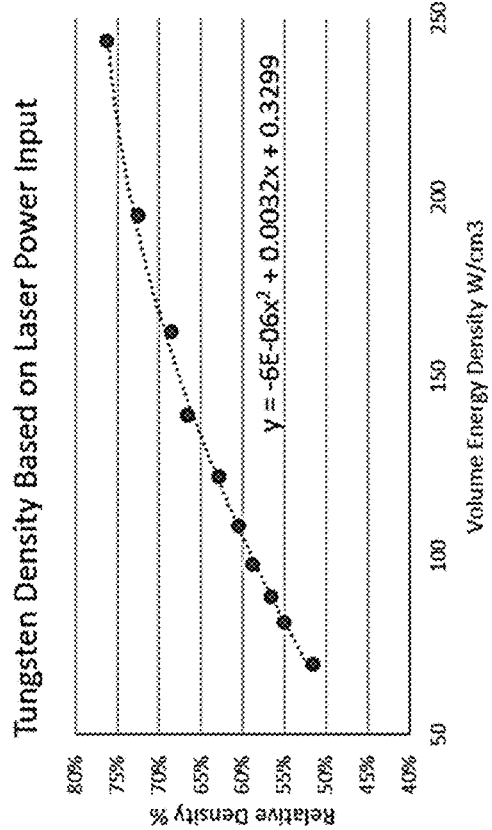
Figure 15B:
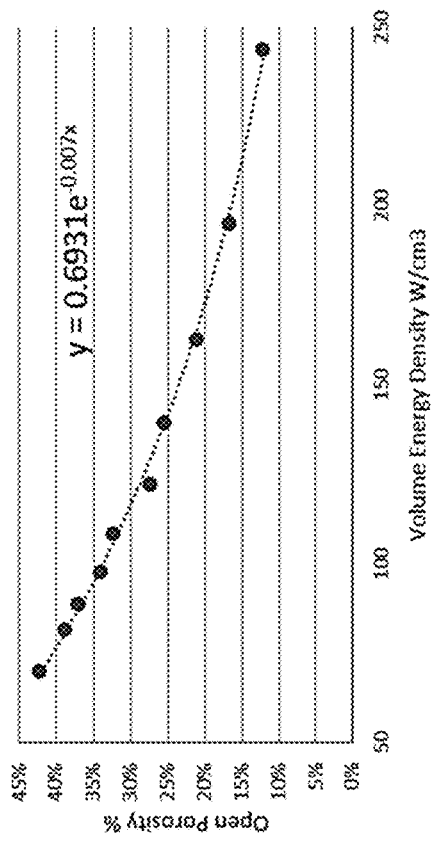

As an example, manufacture of porous material, and the proper settings for the build in a direct metal laser sintering machine can be determined for Tungsten in FIGS. 15A through 15C. FIG. 15A is a chart showing experimental data for porosity control based on energy input. FIG. 15B is a chart providing experimental data for material density relative to energy input, which influences the strength and stiffness of the material. FIG. 15C is a chart providing experimental data for the modulus of elasticity relative to the porosity, which influences the strength and stiffness of the material. This enables the proper porosity and material properties to be manufactured and incorporated into a rocket engine.

Broader applications of the manufacturing methods herein include jet engines and internal combustion engines where similar principles of film cooling, fluid flow, and combustion instability are applicable.

Additional uses, among other things, are taking advantage of the controllable porosity, stiffness, and strength of the materials include for insulation purposes, lightweight structures, controllable deformation under thermal change, adaptive optics, filtration, dispersers, gas separation or membranes, light weight heating elements, cryogenics through CTE control, and impact absorption in an armor system. In catalytic converters, Applicants can increase to provide more time for catalyst contact or decrease path length to decrease pressure build up. Applicants' helical channels may be used to swirl fuel in a car engine so that it has more consistent spray everywhere, in effect decreasing corrosion and pitting.

As an alternative method of creating porosity that can be incorporated with the methods disclosed herein, the RAM method may be used which leaves behind reaction residuals, such as ceramics inside a metal matrix in the best mode. The ceramic particles may then be removed from the metal matrix, such as with caustic and acidic rinses in an autoclave, leaving the metal matrix intact. The places where ceramic particles had been would then be open porosity, and fully imbedded ceramic particles inside the matrix would remain as they would not be exposed to the wash. This prevents the occurrence of closed pores inside the material, either filled with the print atmosphere or un-sintered powder. Additionally, a volatile component such as an element or compound with a low boiling point or that will decompose into gas or vapor. When combined with suitable laser parameters, this method will leave behind open channels that may have a preferential alignment with the vertical build direction.

Additionally or alternatively, the chamber could be filled with a gas with surface active components (Instead of an inert gas) that are either involved in chemical reactions with the exposed powders or fills the voids to adjust the properties of the final printed item.

Additionally or alternatively, powders and alloy compositions and subcomponents can be chosen for their wettability properties to wick material into the sintered pores to change the pore size or shape to give further control over tuning and dampening.

Unless otherwise defined, all technical and scientific terms used herein have the same meaning as commonly understood by one of ordinary skill in the art to which the claims features belong. Moreover, Applicants inconsistent use of a term should not be construed as different terms unless defined by Applicant or the context. Although methods and materials similar to or equivalent to those described herein can be used in the practice or testing of the additively manufactured non-uniform porous material in-situ with fully dense material, suitable methods and materials are described above. All publications, patent applications, patents, and other references mentioned herein are incorporated by reference in their entirety to the extent allowed by applicable law and regulations. The additively manufactured non-uniform porous material in-situ with fully dense material may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Other objects and advantages of the various embodiments of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

There has thus been outlined, rather broadly, some of the features of the additively manufactured non-uniform porous material in-situ with fully dense material in order that the detailed description thereof may be better understood, and in order that the present contribution to the art may be better appreciated. There are additional features of the additively manufactured non-uniform porous material in-situ with fully dense material that will be described hereinafter and that will form the subject matter of the claims appended hereto. In this respect, before explaining at least one embodiment of the additively manufactured non-uniform porous material in-situ with fully dense material in detail, it is to be understood that the additively manufactured non-uniform porous material in-situ with fully dense material is not limited in its application to the details of construction or to the arrangements of the components set forth in the following description or illustrated in the drawings.

It will be apparent to those skilled in the art that various modifications and variation can be made to the disclosed AM methods, software, hardware, materials and components herein. Other embodiments will be apparent to those skilled in the art from consideration of the specification and practice of the disclosed inventions. Numerous modifications, changes, variations, substitutions, and equivalents will occur to those skilled in the art without departing from the spirit and scope of claimed invention. It is intended that the specification and examples be considered as exemplary only, with a true scope being indicated by the claims and their equivalents. The benefits, advantages, solutions to problems, and any element(s) that may cause any benefit, advantage, or solution to occur or become more pronounced are not to be construed as a critical, required, or essential features or elements of any or all the claim. Accordingly, the specification and figures are to be regarded in an illustrative rather than a restrictive sense, and all such modifications are intended to be included within the scope of the claimed invention. Likewise, it is to be understood that the phraseology and terminology employed herein are for the purpose of the description and should not be regarded as limiting.

Regarding additional interpretation and construction of terms and steps herein, method steps are not in any specified order unless dictated by the context or specific wording. In addition, the use of a word in the singular form should be interpreted where the context allows or does not restrict so as to enable plurality or an "at least one" construction. Positional and directional terms described in this specification may be understood to be different than shown or described, and should not limit the variations of embodiments possible from the claimed features that a person of ordinary skill in the art would understand from the specification, figures and claims. The term "and/or" in a list means all list items present, some list items present, or one of the list items present, unless such construction is limited by the context.

INDUSTRIAL APPLICABILITY

In addition to the goals stated above, the apparatus and methods herein can be used to build better and cheaper components with enhanced tunable qualities using existing AM machines without adding hardware.

The invention claimed is:

1. An additive manufacturing method, the method steps comprising:
   determining a desired non-uniform porosity profile across an injector to be manufactured for a rocket engine, said injector comprising a porous disk and a fully dense exterior, said porous disk further comprising a porous region and a denser region;
   calculating and programming for the desired porosity profile, based at least on particle size and materials characteristics of powder in a powder source, energy source settings, laser settings, and a build profile for the injector to be manufactured;
   covering a surface with the powder from the powder source;
   scanning selectively the energy with the laser settings and the build profile at least once across the powder to at least partially melt the powder exposed to the energy to form fully dense wire-like lines and at least partially sinter the powder between the wire-like lines to form the porous region and at least partially bind the powder with prior layers and adjacent areas; and repeating the covering and scanning steps to build the injector layer by layer until a lattice-like structure of pore channels forms from the wire-like lines creating channel walls with the at least partially sintered powder inside the pore channels, wherein the step of scanning creates the porous region in the injector at first energy source settings and a first build profile, a denser region in the injector at second energy source settings and a second build profile, and the fully dense exterior, a full penetration mechanically bonded interface between each of the porous region, the denser region, and the fully dense region, and wherein the build profile informs the step of scanning to make non-overlapping passes to create the wire-like lines in a layer in a first direction and in one or more successive iterations of the scanning step to make wire-like lines in at least a second direction at an angle to the lines in the first direction creating a tortuosity of the pore channels capable of controlling or dampening fluid flow in the pore channels.

2. The method of claim 1, wherein the step of scanning creates the full penetration mechanically bonded interface using a scan strategy that overlaps the first build profile and the second build profile so that the scanning of the energy creates the porous region and then creates the wire-like lines directly over portions of the porous region.

3. The method of claim 1, wherein the build profile informs the step of scanning to make one pass that substantially overlaps a second pass to cause the powder to bind to a previously scanned layer without overheating the top of the powder to cause the porosity to decrease to less than the build profile.

4. The method of claim 1, wherein the step of scanning plugs pore channels at random to control flow through the lattice-like structure.

5. The method of claim 1, wherein the step of scanning skips the wire-like lines in at least an area of at least one layer to enable flow through the skipped area in that layer in a direction parallel to the at least one layer, and the skipped area in the at least one layer is sandwiched in between lattice-like structures in other layers.

6. The method of claim 1, wherein the step of scanning makes at least some of a first pass that substantially overlaps at least some of a second pass at a first energy level to create a porous region and another section of the first pass at a second energy level to create a fully dense region, wherein the first energy level is lower than the second energy level.

7. The method of claim 1, wherein the step of scanning makes at least some of a first pass that substantially overlaps at least some of a second pass at a first scan speed to create a porous region and another section of the first pass at a second scan speed to create a fully dense region, wherein the first scan speed is faster than the second scan speed.

8. The method of claim 7, wherein the porous region is structurally supported by the denser region.

9. The method of claim 1, wherein the step of scanning creates a porous disk having a different porosity on a combustion chamber facing side of the disk than the porosity on a side of the disk opposite to the combustion chamber facing side.

10. The method of claim 1, wherein an atmosphere for additively manufacturing the injector is a reactive gas.

11. The method of claim 1, wherein the first build profile and the second build profile has relatively no scan separation distance between them at the full penetration mechanically bonded interface.

12. The method of claim 1, further comprising a second step of scanning selectively the energy with the laser settings and the build profile at least once across the powder to least partially-sinter the powder to form a porous region and at least partially bind the powder with prior layers and adjacent areas, wherein the second step of scanning is applied intermittently, forming the channel walls discontinuously across layers.

13. The method of claim 12, wherein the second scanning step scans at least two layers without creating wire-like lines between scanning steps.

14. The method of claim 12, wherein the second scanning step scans a random number of consecutive layers without creating wire-like lines between scanning steps.

15. The method of claim 12, wherein the forming the channel walls discontinuously across layers have skipped layers that allows enhanced air flow within the lattice-like structure in a direction substantially perpendicular to a radius of the porous disk.

16. The method of claim 1, wherein the step of scanning is repeated so that each layer is formed with wire-like lines.

17. The method of claim 1, wherein the angle is an acute angle.

18. The method of claim 1, a transpiration cooling flow of around 0.1% to 5% fluid flow through the pore channels.

19. The method of claim 1, wherein the pattern of wire-like lines forms a helical channel wall structure.

20. The method of claim 1, wherein the pattern of wire-like lines forms a grid channel wall structure.

21. The method of claim 1, wherein the pattern of wire-like lines forms a pseudo-random channel wall structure.

22. The method of claim 1, wherein the wire-like lines strengthen the porous material.

23. The method of claim 1, wherein the wire-like lines control the fluid flow directions and pathways through the injector.

24. The method of claim 1, wherein the wire-like lines control the fluid flow direction to be perpendicular to layers being formed by the scanning step.

25. The method of claim 1, wherein the porosity profile further comprises a face plate having a porosity configured to cause a pressure drop.

26. The method of claim 25, wherein the pressure drop is 5%.

27. The method of claim 26, wherein the pressure drop is large enough to prevent combustion effects from propagating upstream from the porous disk into fluid systems.

28. The method of claim 26, wherein the pressure drop is large enough enable higher throttling capabilities of the rocket engine.

29. The method of claim 1, wherein the porosity is controlled to regulate a fluid pressure drop and face cooling of the porous disk based on the rocket engine.

* * * * *